(12) United States Patent  (10) Patent No.: US 8,939,566 B2
Nakazawa et al.  (45) Date of Patent: Jan. 27, 2015

(54) INK JET PRINTING INK

(75) Inventors: Ikuo Nakazawa, Kawasaki (JP);
Masayuki Ikegami, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 13/512,829

(22) PCT Filed: Nov. 29, 2010

(86) PCT No.: PCT/JP2010/006945
§ 371 (c)(1),
(2), (4) Date: May 30, 2012

(87) PCT Pub. No.: WO2011/067915
PCT Pub. Date: Jun. 9, 2011

(65) Prior Publication Data
US 2012/0236078 A1  Sep. 20, 2012

(30) Foreign Application Priority Data

Dec. 2, 2009 (JP) ................................. 2009-274960
Oct. 19, 2010 (JP) ................................. 2010-234228

(51) Int. Cl.
*B41J 2/01* (2006.01)
*C09D 11/102* (2014.01)
(Continued)

(52) U.S. Cl.
CPC ............. *C09D 11/102* (2013.01); *B41J 2/2107* (2013.01); *B41M 5/0023* (2013.01); *C09D 11/324* (2013.01)
USPC .............................. 347/100; 347/95; 523/160

(58) Field of Classification Search
CPC ............ B41J 2/01; B41J 2/211; B41J 2/1433;
B41J 2/17; B41J 2/17593; B41J 2/2107;
B41J 2/1755; B41J 2/2114; B41J 11/0015;
B41J 2/2056; B41J 2/21; C09D 11/36; C09D
11/40; C09D 11/30; C09D 11/38; C09D
11/322; C09D 11/328; C09D 11/101
USPC ............. 347/100, 95, 96, 101, 102, 103, 105,
347/22, 9, 21; 523/160, 161; 106/31.6,
106/31.13, 31.27
See application file for complete search history.

(56) References Cited

U.S. PATENT DOCUMENTS 5,000,601 A * 3/1991 Wruck ............................ 401/78
5,696,182 A * 12/1997 Kashiwazaki et al. ........ 523/160
(Continued)

FOREIGN PATENT DOCUMENTS

JP 2004-189879 A 7/2004
JP 2004-204079 A 7/2004
(Continued)

*Primary Examiner* — Manish S Shah
(74) *Attorney, Agent, or Firm* — Canon U.S.A., Inc. IP Division

(57) ABSTRACT

An ink jet printing ink for use in an ink jet printing method. The ink is ejected from a print head by the action of thermal energy and includes water, a self-dispersing pigment, and at least two types of resin particles. One of the at least two types of resin particles (resin particle A) and another of the at least two types of resin particles (resin particle B) have an average particle size of 80 nm or more but 220 nm or less and an acid value of 25 mgKOH/g or more but 150 mgKOH/g or less. The resin particle A has a glass transition temperature of 25 degrees Celsius or less. The resin particle B has a glass transition temperature of 25 degrees Celsius or more. A difference in glass transition temperature between the resin particle A and the resin particle B is 10 degrees Celsius or more.

13 Claims, 4 Drawing Sheets

(51) Int. Cl.
*B41J 2/21* (2006.01)
*C09D 11/324* (2014.01)
*B41M 5/00* (2006.01)

(56) References Cited

U.S. PATENT DOCUMENTS

| | | | |
|---|---|---|---|
| 5,814,685 A * | 9/1998 | Satake et al. | 347/100 |
| 6,908,185 B2 * | 6/2005 | Chen et al. | 347/100 |
| 7,553,361 B2 * | 6/2009 | Aoi et al. | 106/31.6 |
| 2001/0008908 A1 * | 7/2001 | Parazak | 347/100 |
| 2005/0004263 A1 * | 1/2005 | Gould et al. | 523/160 |
| 2006/0213390 A1 * | 9/2006 | Itano et al. | 106/31.6 |
| 2006/0256175 A1 * | 11/2006 | Kanaya | 347/100 |
| 2007/0225401 A1 * | 9/2007 | Sarkisian et al. | 347/100 |
| 2008/0207820 A1 * | 8/2008 | Brust et al. | 524/507 |
| 2010/0165019 A1 * | 7/2010 | Koike et al. | 347/100 |
| 2010/0214351 A1 * | 8/2010 | Koike et al. | 347/21 |

FOREIGN PATENT DOCUMENTS

| | | |
|---|---|---|
| JP | 2006-231733 A | 9/2006 |
| WO | 2004/029164 A1 | 4/2004 |

* cited by examiner

INK JET PRINTING INK

This is continuation of PCT/JP2010/006945 filed Nov. 29, 2010, which claims the benefit of Japanese Patent Application No. 2009-274960, filed Dec. 2, 2009 and 2010-234228, filed Oct. 19, 2010.

TECHNICAL FIELD

The present invention relates to an ink jet printing ink.

BACKGROUND ART

Ink jet printing inks are required to have improved fastness properties, such as highlighter resistance and scratch resistance, after the ink jet printing inks are applied to recording media. In order to satisfy this requirement, it is known that resin particles are added to ink to improve the fastness properties. The addition of resin particles can improve the binding between a coloring material and a recording medium or between coloring materials, thereby improving the fastness properties.

As an ink containing resin particles, Japanese Patent Laid-Open No. 2004-204079 describes an ink that contains at least one type of resin particles incapable of forming a film at ambient temperature and at least one type of resin particles capable of forming a film at ambient temperature to improve the scratch resistance of recording images. As the effects of including at least two types of resin particles, for example, the addition of resin particles having different glass transition temperatures may reduce the temperature dependence of the physical properties (such as storage modulus) of the resin particles between the glass transition temperatures after being fixed to a recording medium. When resin particles are added to ink to improve fastness, the resin particles must be fused to form a continuous film. However, if the environmental temperature is lower than the film-forming temperature of the resin particles, it is difficult to fuse the resin particles. In such a case, it is known that the addition of resin particles having a low minimum film-forming temperature can improve the film-forming ability.

However, in an ink described in PTL 1, the addition of resin particles to the ink may result in insufficient dispersion stability of the ink. Furthermore, an ink described in PTL 1 sometimes results in unstable ejection in an ink jet printing method (a thermal ink jet printing method) in which ink is ejected from a print head by the action of thermal energy. This is probably because the addition of resin particles increases the viscosity of the ink or because heat generated by the application of pulses to the ink produces a deposit on a thin-film resistor. Thus, stable ejection of ink requires the prevention of an increase in viscosity caused by the addition of resin particles, foaming of ink into a desired volume on a thin-film resistor, and repeated foaming and defoaming of ink at desired time intervals.

CITATION LIST

Patent Literature

PTL 1: Japanese Patent Laid-Open No. 2004-204079

SUMMARY OF INVENTION

The present invention provides an ink jet printing ink that has high fastness property, and can be stably ejected even by the action of thermal energy.

The present invention can solve the problems described above. The present invention provides an ink jet printing ink for use in an ink jet printing method in which the ink is ejected from a print head by the action of thermal energy. The ink jet printing ink contains water, a self-dispersing pigment, and at least two types of resin particles. One of the at least two types of resin particles (hereinafter referred to as a resin particle A) and another of the at least two types of resin particles (hereinafter referred to as a resin particle B) have an average particle size of 80 nm or more but 220 nm or less and an acid value of 25 mgKOH/g or more but 150 mgKOH/g or less. The resin particle A has a glass transition temperature of 25 degrees Celsius or less. The resin particle B has a glass transition temperature of 25 degrees Celsius or more. A difference in glass transition temperature between the resin particle A and the resin particle B is 10 degrees Celsius or more.

The present invention can provide an ink jet printing ink that has high fastness property, and can be stably ejected even by the action of thermal energy.

DESCRIPTION OF EMBODIMENTS

Figure 1:
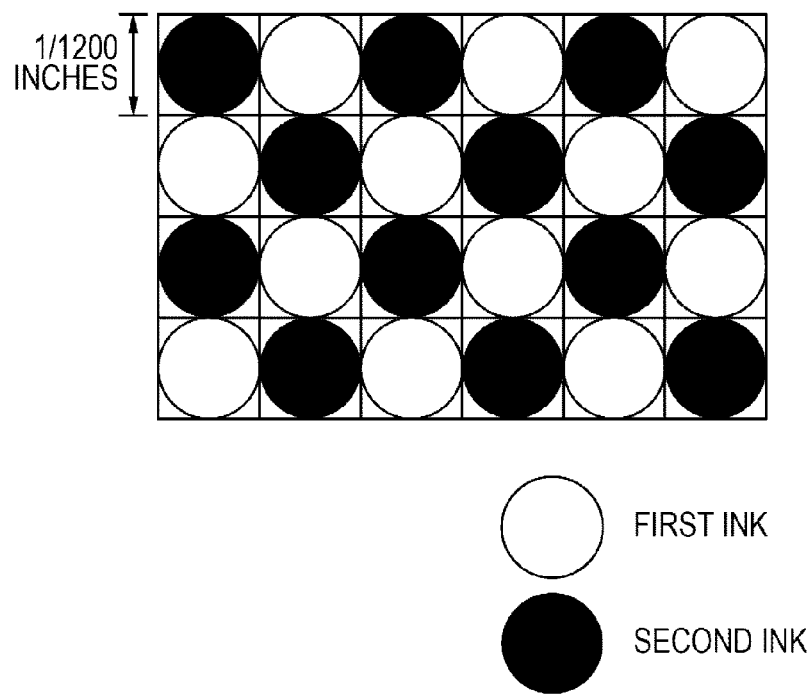
FIG. 1 is a schematic view illustrating a method for forming print dots.

The present invention will be described in detail in the following embodiments.

Ink

Coloring Material

An ink jet printing ink according to one embodiment of the present invention contains a self-dispersing pigment as a coloring material. The self-dispersing pigment can improve water-fastness. The self-dispersing pigment also facilitates the solid-liquid separation of ink on paper, thus improving color developability.

Furthermore, as compared with resin-dispersed pigments, the self-dispersing pigment and the application conditions described below synergistically facilitate the solid-liquid separation of ink and prevent the pigment from permeating deep into a recording medium, thus greatly improving color developability.

Self-dispersing pigments basically do not require dispersants and are stably dispersed by introducing a hydrophilic group on the pigment surface directly or through another atomic group. Examples of pigments before dispersion stabilization include, but are not limited to, conventionally known pigments listed in International Publication No. WO 2009/014242. A hydrophilic group introduced into self-dispersing pigments may be bonded to the pigment surface directly or through another atomic group.

In a self-dispersing pigment to which an acidic functional group is bonded directly or through an atomic group, the acidic functional group releases a proton at a particular pH to become an anionic hydrophilic group. The self-dispersing pigment can therefore be stably dispersed in ink without using a dispersant, such as a resin or a surfactant. Examples of the anionic hydrophilic group include, but are not limited to, $-PO_3(M)_2$, $-COOM$, and $-SO_3M$, wherein M denotes a hydrogen atom, an alkali metal, ammonium, or an organic ammonium. Specific examples of the alkali metal M in the hydrophilic group include, but are not limited to, Li, Na, K, Rb, and Cs. Specific examples of the organic ammonium M include, but are not limited to, methylammonium, dimethylammonium, trimethylammonium, ethylammonium, diethylammonium, triethyl-lammonium, monohydroxymethyl(ethyl)amine, dihydroxymethyl(ethyl)amine, and trihydroxymethyl(ethyl)amine.

Specific examples of another atomic group disposed between the pigment surface and the hydrophilic group include, but are not limited to, straight and branched chain alkylene groups having 1 to 12 carbon atoms, substituted and unsubstituted phenylene groups, and substituted and unsubstituted naphthylene groups. Examples of the substituents of the phenylene groups and naphthylene groups include, but are not limited to, straight and branched chain alkyl groups having 1 to 6 carbon atoms.

Specific examples of a self-dispersing pigment in an ink jet printing ink according to one embodiment of the present invention include, but are not limited to, self-dispersing pigments modified with a functional group including a plurality of phosphonic acid groups, disclosed in PCT Japanese Translation Patent Publication No. 2009-515007, and self-dispersing pigments modified with a hydrophilic group —COOM (wherein M denotes a hydrogen atom, an alkali metal, ammonium, or an organic ammonium), disclosed in Japanese Patent Laid-Open No. 2006-89735.

A self-dispersing pigment in an ink jet printing ink according to one embodiment of the present invention preferably has an average particle size of 60 nm or more, more preferably 70 nm or more, still more preferably 75 nm or more, and preferably 145 nm or less, more preferably 140 nm or less, still more preferably 130 nm or less, as determined by dynamic light scattering in liquid. More specifically, the average particle size can be determined by a method using laser scattering, for example, with FPAR-1000 (manufactured by Otsuka Electronics Co., Ltd., a cumulant analysis) and Nanotrac UPA150EX (manufactured by Nikkiso Co., Ltd., the 50% integrated value). The average particle size, as used herein, refers to the scattering average particle size. Examples of the self-dispersing pigment include, but are not limited to, COJ (trademark) manufactured by Cabot Co. and CW (trademark) manufactured by Orient Chemical Industries Co., Ltd.

These self-dispersing pigments may be used in combination. The proportion of an self-dispersing pigment in an ink according to one embodiment of the present invention is preferably 0.5% by mass or more, more preferably 1.0% by mass or more, still more preferably 2.0% by mass or more, and preferably 15.0% by mass or less, more preferably 10.0% by mass or less, still more preferably 8.0% by mass or less, of the total amount of ink.

A set of color inks for forming color images are basically composed of black, cyan, magenta, and yellow, and optionally red, blue, green, gray, light cyan, and light magenta. It is desirable that the coloring materials of these inks also be self-dispersing pigments.

Resin Particles

An ink jet printing ink according to one embodiment of the present invention contains at least two types of resin particles. The term "a type of resin particles", as used herein, refers to a resin particle group in which each resin particle has the same physical properties, such as an acid value and a glass transition temperature. One of at least two types of resin particles (hereinafter referred to as a resin particle A) and another of at least two types of resin particles (hereinafter referred to as a resin particle B) have an average particle size of 80 nm or more but 220 nm or less, preferably 100 nm or more, more preferably 120 nm or more, still more preferably 130 nm or more, and preferably 210 nm or less, more preferably 200 nm or less. Resin particles having an average particle size below 80 nm may result in unstable ejection, particularly in the thermal ink jet printing method. On the other hand, resin particles having an average particle size above 220 nm may result in deterioration in the dispersion stability and storage stability of the resin particles. The particle size can be determined by a method using laser scattering, for example, with FPAR-1000 (manufactured by Otsuka Electronics Co., Ltd., a cumulant analysis) and Nanotrac UPA150EX (manufactured by Nikkiso Co., Ltd., the 50% integrated value). The average particle size of resin particles, as used herein, refers to the scattering average particle size.

The resin particles A and B have an acid value of 25 mgKOH/g or more but 150 mgKOH/g or less, preferably 140 mgKOH/g or less. The acid value refers to the amount of KOH (mg) required to neutralize 1 g of resin. An acid value above 150 mgKOH/g results in an increase in the viscosity of dispersion liquid, resulting in a tendency to unstable ejection. An acid value below 25 mgKOH/g results in a tendency to poor storage stability of ink. Although the acid value can be calculated from the monomer composition of resin particles, the acid value can be measured by potentiometric titration with Titrino (manufactured by Metrohm AG).

The resin particle A has a glass transition temperature of 25 degrees Celsius or less, and the resin particle B has a glass transition temperature of 25 degrees Celsius or more. A difference in glass transition temperature between the resin particle A and the resin particle B is 10 degrees Celsius or more. 25 degrees Celsius is intended to represent the mean temperature of indoor environments. An ink jet printing ink according to one embodiment of the present invention contains the resin particle A having a glass transition temperature of this temperature or less and the resin particle B having a glass transition temperature of this temperature or more. A difference in glass transition temperature between the resin particle A and the resin particle B is 10 degrees Celsius or more. This difference improves the temperature dependence of the physical properties of resin particles around the room temperature. The resin particle A having a glass transition temperature of 25 degrees Celsius or less facilitates the fusion of resin particles to form a continuous film. The resin particle B having a glass transition temperature of 25 degrees Celsius or more can increase the film strength (storage modulus as an example of physical properties).

The resin particle A preferably has a glass transition temperature of −60 degrees Celsius or more. When the resin particle A has a glass transition temperature below −60 degrees Celsius, even if an ink contains two or more types of resin particles, it is sometimes difficult to form a self-supported film of the resin particles. The resin particle B preferably has a glass transition temperature of 150 degrees Celsius or less. When the resin particle B has a glass transition temperature above 150 degrees Celsius, even if an ink contains two or more types of resin particles, it is sometimes difficult to fuse the resin particles together or form a continuous film.

A difference in glass transition temperature between the resin particle A and the resin particle B is 10 degrees Celsius or more. A difference in glass transition temperature of 20 degrees Celsius or more can improve the temperature dependence of the physical properties of resin particles. In the present invention, the glass transition temperature (Tg) is determined by a common method, for example, with a thermal analysis system, such as a differential scanning calorimeter (DSC).

These resin particles may be formed of an acrylic resin, a methacryl resin, a styrene resin, a urethane resin, an acrylamide resin, an epoxy resin, or an ester resin. These resins may be used as a copolymer and may have a single-phase structure or a multiphase structure (a core-shell structure).

It is desirable that these resin particles be contained in an ink composition in the form of emulsion produced by the emulsion polymerization or the soap-free polymerization of unsaturated monomers. This is because the addition of a dry powder of resin particles to ink may result in insufficient dispersion of the resin particles. The emulsion may be acryl emulsion, which can achieve a high degree of storage stability of an ink composition. Resin particle emulsion can be produce by a known emulsion polymerization method. For example, resin particles dispersed in a water medium can be produced by soap-free emulsion polymerization of a hydrophobic monomer, such as styrene, alpha-methylstyrene, or methyl methacrylate, and a hydrophilic monomer, such as styrenesulfonic acid, vinyltoluenesulfonic acid, 2-acrylamide-2-methylpropanesulfonic acid, acrylic acid, methacrylic acid, itaconic acid, fumaric acid, acrylonitrile, acrylamide, 4-vinylpyridine, N,N-dimethylaminoethyl methacrylate, or an N,N-dimethylaminoethyl methacrylate monoester of maleic acid, using potassium persulfate as an initiator.

Alternatively, the resin particles can be produced by the emulsion polymerization of monomers in water in the presence of a polymerization initiator and a surfactant. Although representative monomers are described below, monomers for use in the present invention are not limited to these monomers. Examples of carboxylic acid monomers include, but are not limited to, acrylic acid, methacrylic acid, itaconic acid, fumaric acid, and maleic acid. Examples of sulfonic acid monomers include, but are not limited to, 3-sulfopropyl (meth)acrylate, vinylstyrenesulfonic acid, and 2-acrylamide-2-methylpropanesulfonic acid. Examples of acrylate monomers include, but are not limited to, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, phenoxyethyl acrylate, and 2-hydroxyethyl acrylate. Examples of methacrylate monomers include, but are not limited to, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, phenoxyethyl methacrylate, 2-hydroxyethyl methacrylate, poly(ethylene glycol) monomethacrylate, and poly(propylene glycol) methacrylate. Examples of cross-linking monomers having two or more polymerizable double bonds include, but are not limited to, diacrylate compounds, such as poly(ethylene glycol) diacrylate, tri-ethylene glycol diacrylate, 1,3-butylene glycol diacrylate, 1,4-butylene glycol di-acrylate, 1,6-hexanediol diacrylate, neopentyl glycol diacrylate, 1,9-nonanediol diacrylate, poly(propylene glycol) diacrylate, 2,2'-bis(4-acryloxypropoxyphenyl)propane, 2,2'-bis(4-acryloxydiethoxyphenyl)propane, and N,N'-methylenebisacrylamide; triacrylate compounds, such as trimethylolpropane triacrylate, trimethylolethane tri-acrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, poly(ethylene glycol) dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, poly(propylene glycol) dimethacrylate, poly(butylene glycol) dimethacrylate, and 2,2'-bis(4-methacryloxydiethoxyphenyl)propane; trimethacrylate compounds, such as trimethylolpropane trimethacrylate and trimethylolethane trimethacrylate; methylenebisacrylamide; and divinylbenzene.

Examples of monomers copolymerizable with the monomers described above include, but are not limited to, aromatic vinyl monomers, such as styrene, alpha-methylstyrene, vinyltoluene, 4-t-butylstyrene, chlorostyrene, vinylanisole, and vinyl-naphthalene; olefins, such as ethylene and propylene; dienes, such as butadiene and chloroprene; vinyl monomers, such as vinyl ether, vinyl ketone, and vinylpyrrolidone; acrylamides, such as acrylamide, methacrylamide, and N,N'-dimethylacrylamide; and monomers containing a hydroxy group, such as 2-hydroxyethyl acrylate, 2-hydroxypropyl acrylate, 2-hydroxyethyl methacrylate, and 2-hydroxypropyl methacrylate.

A method for producing resin particles from these monomers will be described below.

Production Example of Resin Particles

A 300-ml four-neck flask equipped with a sealed stirrer, a stirring rod, a reflux condenser tube, a septum rubber, and a nitrogen inlet is filled with a predetermined amount of monomer and 100 g of distilled water. The flask is purged with nitrogen in a thermostat at 70 degrees Celsius while stirring at 300 rpm for one hour. An initiator dissolved in 100 g of distilled water is then injected into the flask using a syringe to initiate polymerization. The polymerization is monitored by gel permeation chromatography and NMR. Thus, a desired polymerization product is obtained. The resulting resin particles are repeatedly centrifuged and redispersed in distilled water to purify the resin particles in aqueous dispersion. If necessary, the purified resin particles may be concentrated with an evaporator or by ultrafiltration.

The polymerization initiator may be an initiator used in common radical polymerization, for example, potassium persulfate or 2,2'-azobis(2-amidinopropane)dihydrochloride. In addition to the polymerization initiator, a surfactant, a chain transfer agent, and/or a neutralizing agent may be used in accordance with routine procedures. Examples of the neutralizing agent include, but are not limited to, ammonia and inorganic alkaline hydroxides, such as sodium hydroxide and potassium hydroxide. Examples of the surfactant include, but are not limited to, sodium lauryl sulfate, and common anionic surfactants, nonionic surfactants, and amphoteric surfactants. Examples of the chain transfer agent include, but are not limited to, t-dodecyl mercaptan, n-dodecyl mercaptan, n-octyl mercaptan, xanthates, such as dimethylxanthogen disulfide and diisobutylxanthogen disulfide, dipentene, indene, 1,4-cyclohexadiene, dihydrofuran, and xanthene.

Resin particles according to one embodiment of the present invention may be converted into a dry powder and be mixed with the other components of an ink composition. In order to achieve a high degree of dispersion stability of resin particles, it is desirable that the resin particles be dispersed in a water medium to form emulsion (polymer emulsion) and then be mixed with the other components of an ink composition.

The proportion of resin particles in an ink jet printing ink according to one embodiment of the present invention is preferably 0.1% by mass or more, more preferably 0.5% by mass or more, and preferably 20.0% by mass or less, more preferably 10.0% by mass or less. A resin particle content below 0.1% by mass results in poor scratch resistance. A resin particle content above 20.0% by mass tends to result in an excessively high viscosity.

The ratio of the resin particle A content to the resin particle B content in an ink jet printing ink according to one embodiment of the present invention is preferably 0.1 or more but 10.0 or less, more preferably 0.2 or more, and more preferably 4.5 or less, based on mass.

An ink jet printing ink according to one embodiment of the present invention may contain another type of resin particles other than the resin particles A and B. This third type of resin particles also preferably has an average particle size of 80 nm or more but 220 nm or less and an acid value of 25 mgKOH/g or more but 150 mgKOH/g or less.

Salts

An ink jet printing ink according to one embodiment of the present invention may contain an inorganic acid salt and/or an organic acid salt. The organic acid salt or the inorganic acid salt can further improve the advantages of the present invention, such as image density, water-fastness, highlighter resistance, and the quality of lowercase letters. The reason for that is probably as follows. An organic acid salt or an inorganic acid salt in ink applied to a recording medium promotes precipitation of a pigment and resin particles, that is, solid-liquid separation between the pigment and the resin particles and an aqueous medium. This selectively holds the pigment and the resin particles on the surface layer of the recording medium and efficiently fuses the resin particles with the pigment, thus not only improving color developability of recording images but also effectively contributing to water-fastness and highlighter resistance of recording images. An organic acid salt or an inorganic acid salt can shorten the time elapsed from the landing to the fixing of ink. This can prevent blurring and contributes to improvement in the quality of lowercase letters. In order to achieve these advantages, it is desirable that an inorganic acid salt or an organic acid salt be dissociated in ink. It is therefore desirable that an inorganic acid salt or an organic acid salt have an acid dissociation constant (pKa) lower than the pH of ink.

Examples of inorganic acids constituting the inorganic acid salts include, but are not limited to, hydrochloric acid, sulfuric acid, and nitric acid. Examples of organic acids constituting the organic acid salts include, but are not limited to, organic carboxylic acids, such as citric acid, succinic acid, benzoic acid, acetic acid, propionic acid, phthalic acid, oxalic acid, tartaric acid, gluconic acid, tartronic acid, maleic acid, malonic acid, and adipic acid. It is desirable that the organic acids be acetic acid, phthalic acid, and benzoic acid. Examples of the counter ions of the salts include, but are not limited to, alkali metals, ammonium, and organic ammoniums, as in the counter ions of the self-dispersing pigment. Specific examples of alkali metals serving as the counter ions include, but are not limited to, Li, Na, K, Rb, and Cs. Specific examples of the organic ammoniums include, but are not limited to, methylammonium, dimethyl-lammonium, trimethylammonium, ethylammonium, diethylammonium, triethyl-lammonium, monohydroxymethyl(ethyl)ammonium, dihy-droxymethyl(ethyl)ammonium, trihydroxymethyl(ethyl)ammonium, and tri-ethanolammonium.

The proportion of an inorganic acid salt and/or an organic acid salt in an ink jet printing ink according to one embodiment of the present invention is preferably 0.1% by mass or more but 5.0% by mass or less, more preferably 0.2% or more, and more preferably 3.0% by mass or less. Less than 0.1% by mass of an inorganic acid salt and/or an organic acid salt may cause insufficient precipitation of pigment and resin particles of ink on paper. More than 5.0% by mass of an inorganic acid salt and/or an organic acid salt may disadvantageously cause solid-liquid separation in ink and impair the dispersion stability of the ink Aqueous Media An ink jet printing ink according to one embodiment of the present invention contains water. The water content of the ink is preferably 30% by mass or more but 95% by mass or less of the total weight of the ink. It is desirable that water in combination with a water-soluble compound be used as an aqueous medium. The water-soluble compound is highly hydrophilic such that the water-soluble compound is miscible with water without phase separation in a liquid mixture containing 20% by mass of water. In order to prevent solid-liquid separation and clogging, volatile water-soluble compounds are not preferred. It is desirable that the water-soluble compound have a vapor pressure of 0.04 mmHg or less at 20 degrees Celsius.

It is desirable that an ink jet printing ink according to one embodiment of the present invention contain a water-soluble compound having a hydrophilicity-hydrophobicity coefficient of 0.26 or more. The hydrophilicity-hydrophobicity coefficient is defined by the following formula 1. Depending on the type of paper, an ink jet printing ink according to one embodiment of the present invention may contain a water-soluble compound having a hydrophilicity-hydrophobicity coefficient of 0.26 or more but less than 0.37 and a water-soluble compound having a hydrophilicity-hydrophobicity coefficient of 0.37 or more. The hydrophilicity-hydrophobicity coefficient is defined by the following formula 1. In this case, it is sometimes desirable that an ink jet printing ink according to one embodiment of the present invention contain two or more water-soluble compounds having a hydrophilicity-hydrophobicity coefficient of 0.37 or more.

$$\text{Hydrophilicity} - \text{hydrophobicity coefficient} = \frac{(\text{water activity of 20\% aqueous solution}) - (\text{mole fraction of water in 20\% aqueous solution})}{1 - (\text{mole fraction of water in 20\% aqueous solution})} \quad [\text{Math. 1}]$$

The water activity in the formula 1 is calculated by the following equation: water activity=(water vapor pressure of aqueous solution)/(water vapor pressure of pure water). The water activity may be determined by any of various known methods. Among them, a chilled-mirror dew point measurement method is suitable for the materials for use in the present invention. The water activity in the present specification was measured in a 20% aqueous solution of a water-soluble compound at 25 degrees Celsius by the chilled-mirror dew point measurement method with Aqualab CX-3TE (manufactured by Decagon Devices, Inc.).

In accordance with Raoult's law, the percentage of vapor pressure depression of dilute solution is equal to the mole fraction of the solute and is irrelevant to the types of solvent and solute. Thus, the mole fraction of water in aqueous solution is equal to water activity. However, the water activities of aqueous solutions of various water-soluble compounds are often different from the mole fraction of water. The water activity of aqueous solution lower than the mole fraction of water means that the water vapor pressure of aqueous solution is lower than the theoretical calculated value, indicating that the presence of the solute reduces water evaporation. This indicates that the solute has a large hydration force. In contrast, the water activity of aqueous solution higher than the mole fraction of water indicates that the solute has a small hydration force.

The present inventors focused on the point that the degree of hydrophilicity or hydrophobicity of a water-soluble compound in ink has large effects on the promotion of solid-liquid separation between a self-dispersing pigment and an aqueous medium and the performance capabilities of the ink. Thus, the present inventors defined the hydrophilicity-hydrophobicity coefficient expressed by the formula 1. The water activity is measured in aqueous solutions of various water-soluble compounds at a constant concentration of 20% by mass. The formula 1, however, allows the relative comparison of the degree of hydrophilicity or hydrophobicity of various solutes even when the solutes have different molecular weights and the mole fraction of water alters. Because the water activity of aqueous solution does not exceed one, the maximum hydrophilicity-hydrophobicity coefficient is one. Table 1 shows the hydrophilicity-hydrophobicity coefficients calculated by the formula 1 for water-soluble compounds for use in an ink jet ink according to one embodiment of the present invention. Water-soluble compounds for use in the present invention are not limited to these compounds.

TABLE 1

| Compounds | Hydrophilicity-hydrophobicity coefficient |
| --- | --- |
| 1,2-hexanediol | 0.97 |
| 1,2-pentanediol | 0.93 |
| 3-methyl-1,3-butanediol | 0.90 |
| 1,2-butanediol | 0.90 |
| 2,4-pentanediol | 0.88 |
| 1,6-hexanediol | 0.76 |
| 1,7-heptanediol | 0.73 |
| 3-methyl-1,5-pentanediol | 0.54 |
| 1,5-pentanediol | 0.41 |
| Trimethylolpropane | 0.31 |
| Ethyleneurea | 0.30 |
| 1,2,6-hexanetriol | 0.28 |
| 1,2,3-butanetriol | 0.22 |
| Sorbitol | 0.21 |
| Urea | 0.20 |
| Diethylene glycol | 0.15 |
| 1,2,4-butanetriol | 0.15 |
| Glycerin | 0.11 |
| Diglycerin | 0.08 |
| Triethylene glycol | 0.07 |
| Poly(ethylene glycol) 200 | −0.09 |
| Poly(ethylene glycol) 600 | −0.43 |

A water-soluble compound having a target hydrophilicity-hydrophobicity coefficient can be selected from various water-soluble compounds suitable for an ink jet printing ink according to one embodiment of the present invention. The present inventors investigated the relationship between the type of water-soluble compound having different hydrophilicity-hydrophobicity coefficients and various performance capabilities of inks containing the water-soluble compounds and obtained the following knowledge. In an ink that contains a self-dispersing pigment and an inorganic acid salt and/or an organic acid salt suitably used in an embodiment of the present invention, use of a less hydrophilic water-soluble compound having a hydrophilicity-hydrophobicity coefficient of 0.26 or more markedly improved the printing characteristics of lowercase letters, such as bleeding between two colors and the thickening of letters. Glycol structures in which the number of carbon atoms substituted with a hydrophilic group is equal to or smaller than the number of carbon atoms unsubstituted with a hydrophilic group were particularly desirable. This is probably because these water-soluble compounds have a relatively low affinity for water, a self-dispersing pigment, and cellulose fibers on paper and strongly promote solid-liquid separation between the self-dispersing pigment and an aqueous medium. Thus, it is desirable that an ink jet printing ink according to one embodiment of the present invention contain at least one water-soluble compound having a hydrophilicity-hydrophobicity coefficient of 0.26 or more. The hydrophilicity-hydrophobicity coefficient is defined by the formula 1. A water-soluble compound having a hydrophilicity-hydrophobicity coefficient of 0.26 or more but less than 0.37 may be trimethylolpropane. A water-soluble compound having a hydrophilicity-hydrophobicity coefficient of 0.37 or more may have a glycol structure having 4 to 7 carbon atoms, such as 1,2-hexanediol or 1,6-hexanediol. It is desirable that a difference between the hydrophilicity-hydrophobicity coefficients of two or more water-soluble compounds having a hydrophilicity-hydrophobicity coefficient of 0.37 or more be 0.1 or more.

The proportion of the water-soluble compound(s) in an ink according to one embodiment of the present invention is preferably 5.0% by mass or more, more preferably 6.0% by mass or more, still more preferably 7.0% by mass or more, and preferably 40.0% by mass or less, more preferably 35.0% by mass or less, still more preferably 30.0% by mass or less.

Surfactants

It is desirable that an ink jet printing ink according to one embodiment of the present invention contain a surfactant to achieve more balanced ejection stability. The surfactant may be a nonionic surfactant, such as a polyoxyethylene alkyl ether or an ethylene oxide adduct of acetylene glycol. These nonionic surfactants have a hydrophile-lipophile balance (HLB) of 10 or more. The surfactant content of ink is preferably 0.1% by mass or more, more preferably 0.2% by mass or more, still more preferably 0.3% by mass or more, and preferably 5.0% by mass or less, more preferably 4.0% by mass or less, still more preferably 3.0% by mass or less.

Other Additive Agents

In addition to the components described above, an ink jet printing ink according to one embodiment of the present invention may optionally contain other additive agents, such as a pH adjusting agent, a viscosity modifier, an antifoaming agent, a preservative, a fungicide, an antioxidant, and a penetrant to achieve desired physical properties.

Surface Tension

An ink jet printing ink according to one embodiment of the present invention preferably has a surface tension of 34 mN/m or less, more preferably 32 mN/m or less, still more preferably 30 mN/m or less Unlike plain paper, ink jet paper, such as glossy paper and matte paper, has a porous ink-absorbing top layer and therefore rapidly absorbs ink independently of the surface tension of ink. However, plain paper or printing paper containing an internal and/or external sizing agent having a water-repellent effect often absorbs ink slowly. Such plain paper and printing paper have a lower critical surface tension than ink jet paper. The critical surface tension indicates whether or not ink can rapidly wet the surface. An ink having a surface tension of 34 mN/m, which is higher than the critical surface tension of paper, sometimes does not rapidly wet the surface and slowly permeates the paper. Even when the spreadability of an ink having a high surface tension is improved to reduce the contact angle of the ink on paper, it is sometimes difficult to fix the ink to the paper at a high speed. An ink having a surface tension of 34 mN/m or less is mainly absorbed into pores, and an ink having a surface tension above 34 mN/m is mainly absorbed into fibers. The pore absorption is much faster than the fiber absorption. Thus, in order to fix ink to a recording medium at a high speed, an ink according to one embodiment of the present invention may be designed to be mainly absorbed into pores. An ink mainly absorbed into pores is also effective to prevent bleeding of two different color inks printed next to each other. This is because the two color inks are prevented from accumulating simultaneously on the surface. From the perspective of operability, an ink according to one embodiment of the present invention has a surface tension of 20 mN/m or more, preferably 23 mN/m or more, still more preferably 26 mN/m or more. An ink having a surface tension of 20 mN/m or more can maintain a meniscus in a nozzle. This can prevent ink from flowing out of an ejection port, thereby preventing "ink dropping", which is a phenomenon where ink comes out of the nozzle. The surface tension is measured by a Wilhelmy method (a vertical plate method), for example, using CBVP-Z (manufactured by Kyowa Interface Science Co., Ltd.).

Thermal Ink Jet Printing Method

A thermal ink jet printing method that employs an ink jet printing ink according to one embodiment of the present invention will be described below. In a printing method according to one embodiment of the present invention, the amount of ink droplet per ejection is a fixed amount of 0.5 pl or more but 6.0 pl or less, preferably 1.0 pl or more, more preferably 1.5 pl or more, and preferably 5.0 pl or less, more preferably 4.5 pl or less. Less than 0.5 pl of ink droplet is easily affected by air current, resulting in a low precision with which an ink droplet lands on paper. More than 6.0 pl of ink droplet sometimes results in thick deformed letters when small letters of two to five points (one point is approximately 0.35 mm) are printed. The volume of ink to be ejected has a great influence on ink strike-through and is therefore important in duplex printing. In general, plain paper and some types of printing paper, particularly uncoated printing paper, have pores having a size in the range of 0.1 to 100 micrometers, mostly 0.5 to 5.0 micrometers. The term "plain paper", as used herein, refers to paper used in large quantities for printers and copying machines, for example, commercially available high-quality paper, medium-quality paper, copy paper, such as plain paper copier (PPC) paper, and bond paper. The permeation of aqueous ink through plain paper is broadly divided into fiber absorption in which ink is directly absorbed into cellulose fibers of plain paper and pore absorption in which ink is absorbed into pores among cellulose fibers. It is desirable that an ink according to one embodiment of the present invention be mainly absorbed into pores. Thus, an ink according to one embodiment of the present invention in contact with large pores having a size of approximately 10 micrometers or more on the plain paper surface is mainly absorbed into the pores in accordance with the Lucas-Washburn equation. Consequently, the ink permeates particularly deep through these pores. This greatly impairs color developability in plain paper.

A smaller ink droplet has a lower probability of contact with a large pore and is absorbed into the large pore with greater difficulty. Even when a small ink droplet comes in contact with a large pore, the amount of ink that permeates deep through the large pore can be small. Thus, images on plain paper can have excellent color developability. The term "a fixed amount" of ink, as used herein, means that ink is ejected from nozzles having the same structure at a constant driving energy. Under such conditions, a fixed amount of ink is ejected even in the presence of small variations in ejection resulting from a manufacturing error of a device. The application of a fixed amount of ink can stabilize the depth of permeation of ink, increase the density of recording images, and improve the uniformity of images. In contrast, in a system in which the amount of ink to be ejected is altered, instead of a fixed amount of ink, different amounts of ink are ejected, and the depth of permeation of ink varies accordingly. In particular, because of variations in the depth of permeation of ink, a high-density part of a recording image includes a low-density portion. This results in low uniformity of the image. A thermal ink jet printing method is suitable for the ejection of a fixed amount of ink. A thermal ink jet printing method can reduce variations in the depth of permeation of ink, thereby providing high-density uniform recording images. As compared with the ejection of ink using a piezoelectric element, a thermal ink jet printing method is suitable for multi-nozzle, high-density, and high-speed printing.

A printing method that employs an ink jet printing ink according to one embodiment of the present invention is particularly effective when an image formed in a basic matrix contains a portion of 80% duty or more. The duty is calculated from a portion of at least 50 micrometers×50 micrometers. An image containing a portion of 80% duty or more refers to an image that contains a portion formed by applying ink to 80% or more of the lattices in a part of the matrix from which the duty is calculated. The size of each lattice depends on the resolution of the basic matrix. If the resolution of the basic matrix is 1200 dpi×1200 dpi, one lattice has a size of 1/1200 inch×1/1200 inch. An image containing a portion of 80% duty or more in the basic matrix is an image containing a portion of 80% duty or more in the basic matrix with a single color ink. For example, an image containing a portion of 80% duty or more in the basic matrix is formed with at least one of four color inks of black, cyan, magenta, and yellow. An image not containing a portion of 80% duty or more in the basic matrix has a relatively small overlap between ink droplets and often causes few problems, such as deformed letters and bleeding, without the modification of the printing process. A basic matrix for use in the present invention can be freely set in a printer. The resolution of the basic matrix is preferably 600 dpi or more, more preferably 1200 dpi or more, and preferably 4800 dpi or less. The vertical resolution and the horizontal resolution in this range may be the same or different.

A printing method that employs an ink jet printing ink according to one embodiment of the present invention is particularly effective when an image containing a portion of 80% duty or more and formed in a basic matrix contains a portion having 5.0 microliters/centimeter$^2$ or less of ink.

In one embodiment of the present invention, in order to form such an image, the ink can be applied twice or more. The amount of ink applied each time is 0.7 microliters/centimeter$^2$ or less, preferably 0.6 microliters/centimeter$^2$ or less, more preferably 0.5 microliters/centimeter$^2$ or less. The application of more than 0.7 microliters/centimeter$^2$ of ink at a time may result in ink strike-through, deformed letters, or bleeding.

Figure 3:
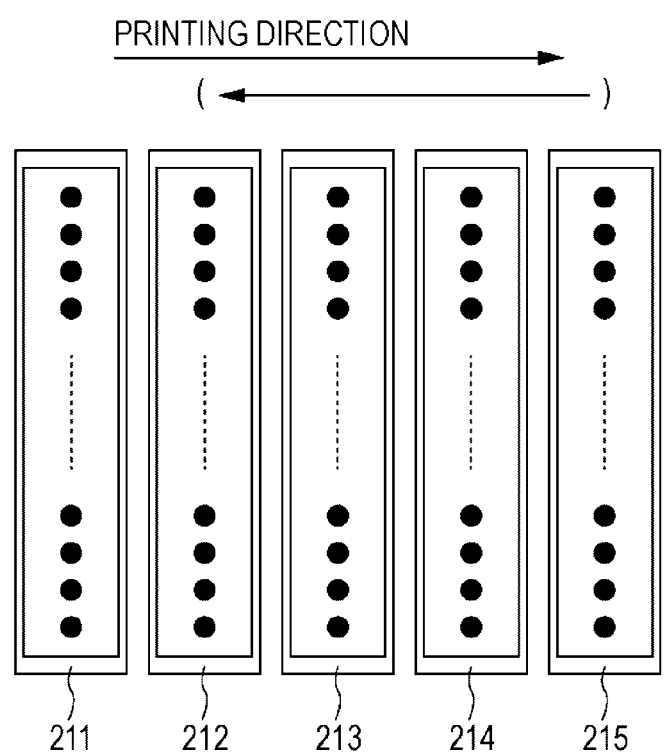
FIG. 3 is a schematic view of a serial print head.

In one embodiment of the present invention, it is desirable that the ink be applied twice or more. This is because the split application of ink greatly improves the performance. The number of applications is at least two. Three or more applications can provide higher-density images with excellent color developability. The number of applications is preferably eight or less, more preferably four or less. More than eight applications can effectively prevent bleeding and print excellent lowercase letters but tend to reduce the hiding power and color developability of ink on the plain paper surface. Two or more applications of ink can be performed in serial or line printing. For example, when solid printing is performed by two applications with a serial printer, a print head passes over a recording medium two times (two-pass). Although the same amount of ink is often ejected in each application, the amount of ink may be different in each application. FIG. 1 illustrates a dot arrangement of two-pass printing in which 50% ink is first applied to one portion of a recording medium and the remaining 50% ink is then applied to the other portion. The dot arrangement illustrated in FIG. 1 can be obtained with a line printer by two split applications in a single pass. For example, FIG. 3 illustrates a print head for two split applications of black ink in a single pass. Color heads 211, 212, 213, 214, and 215 eject black (K), cyan (C), magenta (M), yellow (Y), and black (K) ink, respectively. The black ink is applied with two nozzle arrays in a single pass. Likewise, the number of nozzle arrays or the number of inks can be altered to apply various inks twice or more substantially in a single pass. The advantages of an ink jet printing ink according to one embodiment of the present invention are remarkable in the case that the time elapsed from the initial application to the final application of an ink in a head is 1 or more but less than 200 msec.

Thermal Ink Jet Printer

A thermal ink jet printer that includes an ink jet printing ink according to one embodiment of the present invention will be described below. A suitable printer includes a print head that ejects ink by the action of thermal energy.

Representative structures and the principle of a print head that ejects ink by the action of thermal energy are basically disclosed in U.S. Pat. Nos. 4,723,129 and 4,740,796, for example. These are applicable to both on-demand and continuous print heads. On-demand print heads are advantageous. More specifically, in on-demand print heads, at least one drive signal is applied to an electric thermal conversion member disposed correspondingly to a sheet or liquid path containing ink. The drive signal corresponds to information to be printed and causes a rapid temperature rise that surpasses nucleate boiling. This application generates thermal energy in the electric thermal conversion member and causes film boiling on a print head surface to which heat is applied, thereby forming air bubbles in the ink in one-to-one correspondence with the drive signal. The expansion and contraction of air bubbles allow ink to be ejected from an ejection opening to form at least one droplet. Pulsed drive signals can rapidly and appropriately expand and contract air bubbles and provide a fixed amount of ink with excellent responsivity.

Figure 2:
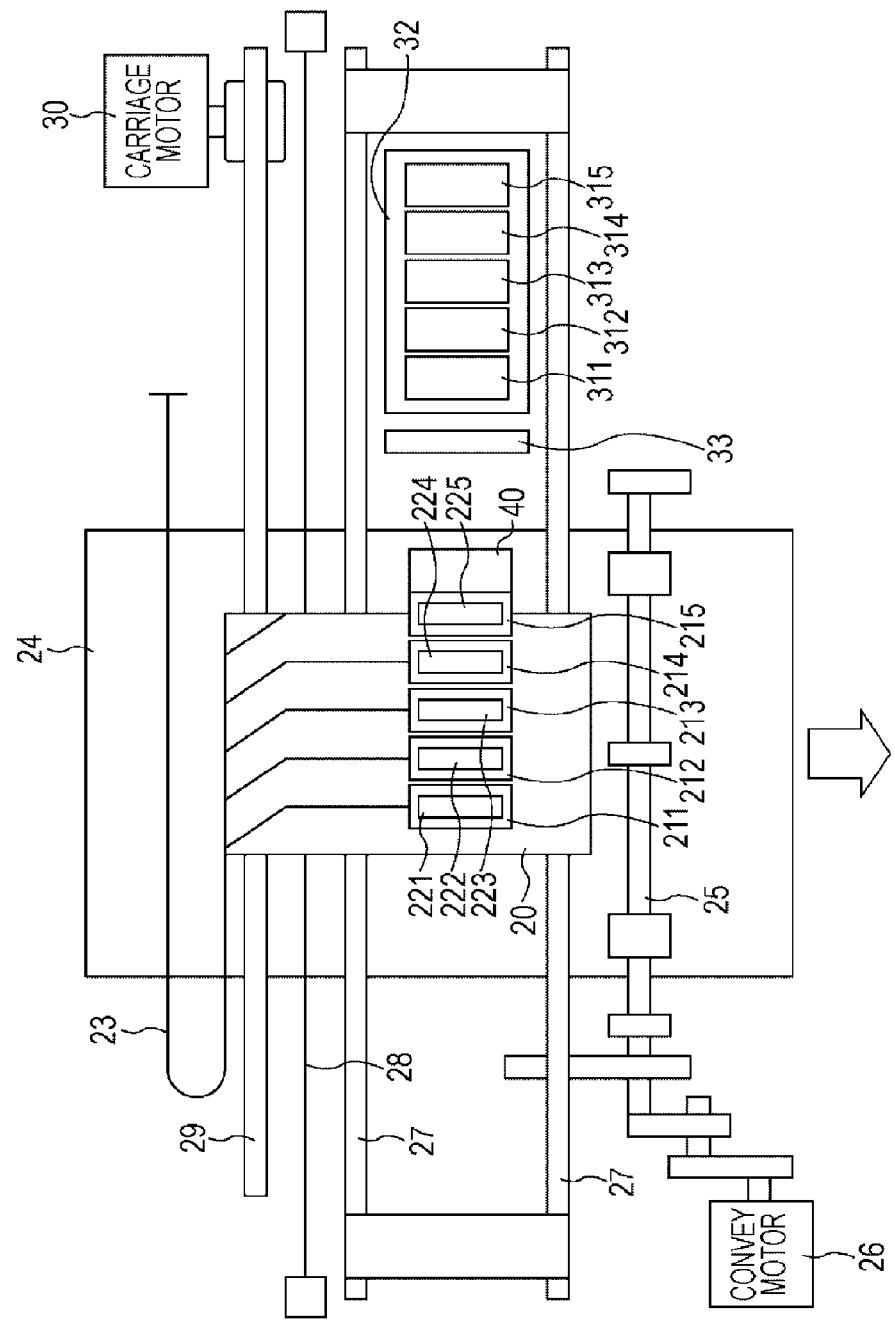
FIG. 2 is a schematic view of an ink jet printer.

FIG. 2 is a schematic view of an ink jet printer according to one embodiment of the present invention. A plurality of ink jet print heads 211 to 215 are mounted on a carriage 20. The print heads 211 to 215 include ink nozzles for ejecting ink. In the case that black ink is applied twice in a single pass, the print heads 211 to 215 eject black (K), cyan (C), magenta (M), yellow (Y), and black (K), respectively. The print heads 211 to 215 and ink tanks for supplying ink to the print heads 211 to 215 constitute ink cartridges 221 to 225. A reflective density sensor 40 installed on a side surface of the carriage 20 detects the density of a test pattern printed on a recording medium. Control signals to the print heads 211 to 215 are transferred through a flexible cable 23. A recording medium 24 having cellulose fibers exposed at the surface, such as a sheet of plain paper, is conveyed on a conveying roller (not shown), is held between discharge rollers 25, and is conveyed in the direction of the arrow (a sub-scanning direction) as a convey motor 26 is driven. The carriage 20 is guided and supported by guide shafts 27 and a linear encoder 28. The carriage 20 reciprocates with a driving belt 29 in the main scanning direction along the guide shaft 27 as a carriage motor 30 is driven. A heating element (an electrothermal energy conversion member) that generates thermal energy for the ejection of ink is disposed within the ink nozzles of the print heads 211 to 215 (liquid paths). In accordance with the read timing of the linear encoder 28, the heating element is driven on the basis of the printing signal to allow ink droplets to be ejected onto a recording medium, forming images. A recovery unit 32 is disposed at the home position of the carriage 20 outside the printing area. The recovery unit 32 includes cap units 311 to 315. When printing is not performed, the carriage 20 returns to the home position, and the ink nozzles of the print heads 211 to 215 are sealed with their respective cap units 311 to 315. These cap units can prevent the adhesion of ink resulting from the evaporation of ink solvent and contamination with foreign substances, such as dust, thereby preventing clogging of the ink nozzles. The capping function of the cap units can also be used to eliminate poorly controlled ejection and clogging of a less frequently used ink nozzle. More specifically, the cap units can be used in blank ejection (flushing) to prevent poorly controlled ejection. In the blank ejection, ink is ejected toward the cap units. The cap units can also be used for the recovery of a defective ejection port. In the recovery, ink is removed from a capped ink nozzle by suction with a pump (not shown). An ink receiver 33 receives ink droplets preliminarily ejected when the print heads 211 to 215 pass over the ink receiver 33 immediately before printing. A blade and a scrubber (not shown) disposed adjacent to the cap units can clean the surface of the print heads 211 to 215 on which the ink nozzles are disposed.

As described above, recovery and subsidiary units for a print head can further stabilize printing. Specific examples of the recovery and subsidiary units for a print head include, but are not limited to, a capping unit, a cleaning unit, a pressure unit, a suction unit, and a preheating unit, such as an electric thermal conversion member, another heating element, or a combination thereof. A preparatory ejection mode for a non-printing purpose is also effective in performing stable printing. The print head according to the present embodiment may be integrated with an ink tank as a cartridge print head. A replaceable chip-type print head may also be used. The chip-type print head mounted in the main body of a printer allows electrical connection with the main body and ink supply from the main body.

Figure 4:
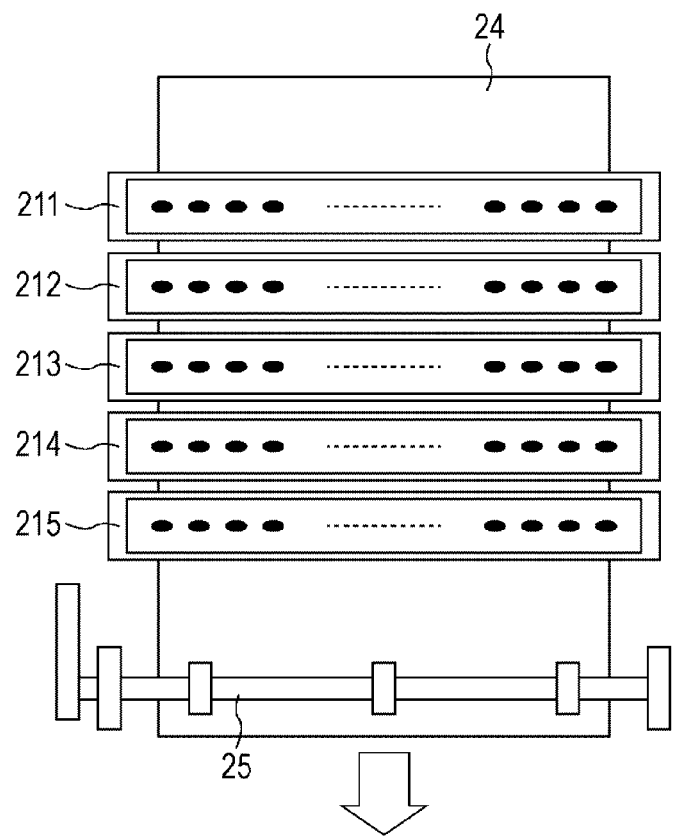
FIG. 4 is a schematic view of a line print head.

Although the print head illustrated in FIG. 3 is a serial print head that is scanned for printing, a full-line print head having a length corresponding to the width of a recording medium may also be used. The full-line print head may have a structure in which serial print heads are arranged in a staggered or parallel form in a target length, as illustrated in FIG. 4. Alternatively, the full-line print head may be a single integrated print head formed so as to have an originally elongated nozzle array.

A printer having the serial or line print heads described above employs independent or integrated four color inks (Y, M, C, and K) and includes five ejection-port-array (or nozzle-array) heads, which include black ink heads 211 and 215 for two split applications of black ink. In another embodiment of split applications with four ejection-port arrays (or nozzle arrays), at least one of four color inks (Y, M, C, and K) are placed in a plurality of ejection-port arrays (or nozzle arrays). For example, two or three sets of four ejection-port-array (or nozzle-array) heads may be coupled to constitute eight ejection-port-array (or nozzle-array) heads or 12 ejection-port-array (or nozzle-array) heads.

In an ink jet printer according to one embodiment of the present invention, in order to form an image containing a portion of 80% duty or more having 5.0 microliters/centimeter$^2$ or less of ink in a basic matrix, the ink can be applied more than once. The amount of each split application is preferably 0.7 microliters/centimeter$^2$ or less. An ink jet printer according to one embodiment of the present invention has a control mechanism for split applications. The control mechanism controls the timing of the operation of an ink jet print head and the feed of a plain paper sheet to perform split applications.

Recording Media

Recording media used in the present invention will be described below. Examples of recording media include, but are not limited to, plain paper and glossy photo paper for household and business use and printing paper used in printing industry. Plain paper has no particular functional layer on the surface. Representative examples of plain paper include, but are not limited to, paper used in large quantities for printers and copying machines, for example, commercially available high-quality paper, medium-quality paper, copy paper, such as plain paper copier (PPC) paper, and bond paper. Specific examples of plain paper include, but are not limited to, Office Planner for PPC and Bubble Jet (BJ) printers, white recycled paper EW-100, and PB paper GF-500 (all manufactured by Canon Marketing Japan Inc.).

Glossy photo paper has an ink-absorbing layer on a substrate. Specific examples of glossy photo paper include, but are not limited to, PT-101, PR-201, PR-101, GL-101, SG-201, GP-501, and MP-101 (all manufactured by Canon Marketing Japan Inc.).

Matte photo paper MP-1011 (manufactured by Canon Marketing Japan Inc.) is another example of glossy photo paper.

Some printing paper has a coating layer and others have no coating layer. The coating layer is a coat on the front and/or back side of high-quality or medium-quality paper or a coat formed on the surface during paper making to improve the appearance and smoothness of the surface of paper.

Specific examples of printing paper having no coating layer include, but are not limited to, OK high-quality paper and OK prince high-quality paper (manufactured by Oji Paper Co., Ltd.).

In accordance with Ministry of Economy, Trade and Industry, "Kogyo chosa tokei (Industrial Research and Statistics)" or "Kami itagamino hinsyu bunruihyo (Classification system for paper and paperboard)" in Japan Paper Association, "Kami itagami tokei nenpo (Annual report on paper and paperboard statistics)", printing paper having a coating layer is divided into "Toko insatu yoshi (coated printing paper)" and "Bitoko insatu yoshi (ultra lightweight coated paper)" of "Insatsu joho yoshi (Printing and communication paper)". The "coated printing paper" has a coating layer formed by coating both faces of the paper with approximately 15 to 40 g/m² of paint in total. The "ultra lightweight coated paper" has a coating layer formed by applying a total of 12 g/m² or less of paint to both faces of the paper. The "coated printing paper" is classified into art paper, coated paper, lightweight coated paper, and others (cast-coated paper and embossed paper) in accordance with the coating weight and the surface treatment method after coating. The "coated printing paper" is sometimes classified into gloss paper, matte paper, and dull paper in accordance with surface gloss. Specific examples of the "coated printing paper" include, but are not limited to, art paper, such as OK ultra aquasatin, OK Kinfuji, SA Kinfuji, and Satin Kinfuji (manufactured by Oji Paper Co., Ltd.), Hyperpyrenee and Silverdia (manufactured by Nippon Paper Industries Co., Ltd.), Green Utrillo (manufactured by Daio Paper Co.), Pearl Coat and New V Matte (manufactured by Mitsubishi Paper Mills, Ltd.), Raicho Super Art (manufactured by Chuetsu Pulp & Paper Co., Ltd.), and Hi-Mckinley (manufactured by Gojo Paper MFG., Co., Ltd.); coated paper, such as OK Topcoat, OK Topcoat dull, OK Topcoat matte, OK Trinity, and OK Casablanca (manufactured by Oji Paper Co., Ltd.), Aurora Coat, Silverdia, and Shiraoi matte (manufactured by Nippon Paper Industries Co., Ltd.), Green Utrillo (manufactured by Daio Paper Co.), and Pearl Coat and New V Matte (manufactured by Mitsubishi Paper Mills, Ltd.); lightweight coated paper, such as OK Coat L (manufactured by Oji Paper Co., Ltd.), Aurora L, Easter DX, and Pegasus (manufactured by Nippon Paper Industries Co., Ltd.), Utrillo Coat L (manufactured by Daio Paper Co.), Pearl Coat L (manufactured by Mitsubishi Paper Mills, Ltd.), Super Emine (manufactured by Chuetsu Pulp & Paper Co., Ltd.), and Dream Coat (manufactured by Marusumi Paper Co., Ltd.); and cast-coated paper, such as Mirror Coat Platinum, OK Chrome (manufactured by Oji Paper Co., Ltd.), Esprit Coat (manufactured by Nippon Paper Industries Co., Ltd.), and Picasso Coat (manufactured by Daio Paper Co.). Specific examples of the "ultra lightweight coated paper" include, but are not limited to, OK Ever Light, OK Crystal, and OK Prunus White (manufactured by Oji Paper Co., Ltd.), and Pyrenee DX and Aurora S (manufactured by Nippon Paper Industries Co., Ltd.).

EXAMPLES

The present invention will be further described in the following examples and comparative examples. Unless otherwise specified, parts are based on mass. The average particle size was measured with Nanotrac UPA150EX (manufactured by Nikkiso Co., Ltd., the 50% integrated value of the volume-average particle size). The acid value of resin particles was measured in the aqueous dispersion with a Titrino potentiometric titrator (manufactured by Metrohm AG). The glass transition temperature was measured with DSC822 (manufactured by Mettler-Toledo International Inc.). The weight-average molecular weight was measured with HLC-8220GPC (manufactured by Tosoh Co.).

Production of Self-Dispersing Pigment A 10 g of carbon black having a specific surface area of 320 m²/g and a DBP absorption of 110 ml/100 g and 3.2 g of 4-aminobenzenephosphonic acid were sufficiently mixed in 70 g of water. 1.62 g of nitric acid was added dropwise to the mixture and was stirred at 70 degrees Celsius. After a few minutes, 1 g of sodium nitrite dissolved in 5 g of water was added to the mixture and was stirred for one hour. The resulting slurry was passed through a filter paper (trade name: No. 2, manufactured by Advantec Toyo Kaisha, Ltd.). Pigment particles collected were sufficiently washed with water and were dried in an oven at 90 degrees Celsius. Thus, a black pigment (self-dispersing pigment A) was produced in which a group having a chemical formula 1 was introduced on the surface of the carbon black.

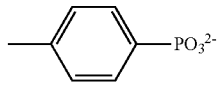

[Chem. 1]

Production of Self-Dispersing Pigment B

A self-dispersing pigment B was produced in the same manner as the self-dispersing pigment A except that the carbon black was replaced by C.I. pigment yellow 74.

Production of Self-Dispersing Pigment C

A self-dispersing pigment C was produced in the same manner as the self-dispersing pigment A except that the carbon black was replaced by C.I. pigment red 122.

Production of Self-Dispersing Pigment D

A self-dispersing pigment D was produced in the same manner as the self-dispersing pigment A except that the carbon black was replaced by C.I. pigment blue 15:3.

Production of Self-Dispersing Pigment E 100 g of carbon black having a specific surface area of 220 m$^2$/g and a DBP absorption of 105 ml/100 g and 34.1 g of p-aminobenzoic acid were sufficiently mixed in 720 g of water. 16.2 g of nitric acid was added dropwise to the mixture and was stirred at 70 degrees Celsius. After 10 minutes, 10.7 g of sodium nitrite dissolved in 50 g of water was added to the mixture and was stirred for one hour. The resulting slurry was passed through a filter paper (trade name: No. 2, manufactured by Toyo Roshi Kaisha, Ltd.). Pigment particles collected were sufficiently washed with water and were dried in an oven at 90 degrees Celsius. Thus, a self-dispersing black pigment was produced in which a p-benzoic acid group was introduced on the surface of the carbon black. 10% by mass of this pigment in ion-exchanged water was adjusted to pH 7.5 with aqueous ammonia. Filtration with a prefilter and a 1-micrometer filter yielded a self-dispersing pigment E.

Production of Self-Dispersing Pigment F

A self-dispersing pigment F was produced in the same manner as the self-dispersing pigment E except that the carbon black was replaced by C.I. pigment yellow 74.

Production of Self-Dispersing Pigment G

A self-dispersing pigment G was produced in the same manner as the self-dispersing pigment E except that the carbon black was replaced by C.I. pigment red 122.

Production of Self-Dispersing Pigment H

A self-dispersing pigment H was produced in the same manner as the self-dispersing pigment E except that the carbon black was replaced by C.I. pigment blue 15:3.

Production of Resin Particle A

In accordance with the production example of resin particles described above, 9.0/1.5 (mass ratio) of styrene/acrylic acid were polymerized. After the polymerization, purification and concentration yielded a resin particle A with a solid content of 10% by mass. The resin particle A had an average particle size of 283 nm, an acid value of 100 mgKOH/g, and a glass transition temperature (Tg) of 110 degrees Celsius.

Production of Resin Particle B

In accordance with the production example of resin particles described above, polymerization was performed using 9/1.5/0.1 (weight ratio) of styrene/acrylic acid/sodium dodecyl sulfate as monomers and an emulsifier. After the polymerization, purification and concentration yielded a resin particle B with a solid content of 10% by mass. The resin particle B had an average particle size of 97 nm, an acid value of 90 mgKOH/g, and a glass transition temperature of 121 degrees Celsius.

Production of Resin Particle C

In accordance with the production example of resin particles described above, polymerization was performed using 9.0/1.5/0.15 (mass ratio) of styrene/acrylic acid/sodium dodecyl sulfate as monomers and an emulsifier. After the polymerization, purification and concentration yielded a resin particle C with a solid content of 10% by mass. The resin particle C had an average particle size of 96 nm, an acid value of 100 mgKOH/g, and a glass transition temperature of 100 degrees Celsius.

Production of Resin Particle D

In accordance with the production example of resin particles described above, polymerization was performed using 9.0/1.5/0.25 (mass ratio) of styrene/acrylic acid/sodium dodecyl sulfate as monomers and an emulsifier. After the polymerization, purification and concentration yielded a resin particle D with a solid content of 10% by mass. The resin particle D had an average particle size of 77 nm, an acid value of 100 mgKOH/g, and a glass transition temperature of 122 degrees Celsius.

Production of Resin Particle E

In accordance with the production example of resin particles described above, polymerization was performed using 9.0/1.5/0.5 (mass ratio) of styrene/acrylic acid/sodium dodecyl sulfate as monomers and an emulsifier. After the polymerization, purification and concentration yielded a resin particle E with a solid content of 10% by mass. The resin particle E had an average particle size of 48 nm, an acid value of 100 mgKOH/g, and a glass transition temperature of 111 degrees Celsius.

Production of Resin Particle F

In accordance with the production example of resin particles described above, polymerization was performed using 9.0/1.5/1.5 (mass ratio) of styrene/acrylic acid/sodium dodecyl sulfate as monomers and an emulsifier. After the polymerization, purification and concentration yielded a resin particle F with a solid content of 10% by mass. The resin particle F had an average particle size of 41 nm, an acid value of 100 mgKOH/g, and a glass transition temperature of 112 degrees Celsius.

Production of Resin Particle G

In accordance with the production example of resin particles described above, polymerization was performed using 9.0/1.5/3.0 (mass ratio) of styrene/acrylic acid/sodium dodecyl sulfate as monomers and an emulsifier. After the polymerization, purification and concentration yielded a resin particle G with a solid content of 10% by mass. The resin particle G had an average particle size of 28 nm, an acid value of 100 mgKOH/g, and a glass transition temperature of 101 degrees Celsius.

Production of Resin Particle H

In accordance with the production example of resin particles described above, polymerization was performed using 9.0/4.5/0.5 (mass ratio) of styrene/acrylic acid/sodium dodecyl sulfate as monomers and an emulsifier. After the polymerization, purification and concentration yielded a resin particle H with a solid content of 10% by mass. The resin particle H had an average particle size of 81 nm, an acid value of 182 mgKOH/g, and a glass transition temperature of 116 degrees Celsius.

Production of Resin Particle I

In accordance with the production example of resin particles described above, polymerization was performed using 9.0/9.0/0.5 (mass ratio) of styrene/acrylic acid/sodium dodecyl sulfate as monomers and an emulsifier. After the polymerization, purification and concentration yielded a resin particle I with a solid content of 10% by mass. The resin particle I had an average particle size of 84 nm, an acid value of 318 mgKOH/g, and a glass transition temperature of 119 degrees Celsius.

Production of Resin Particle J

In accordance with the production example of resin particles described above, polymerization was performed using 6.0/3.0/1.5/0.5 (mass ratio) of styrene/n-butyl acrylate/acrylic acid/sodium dodecyl sulfate as monomers and an emulsifier. After the polymerization, purification and concentration yielded a resin particle J with a solid content of 10% by mass. The resin particle J had an average particle size of 44 nm, an acid value of 100 mgKOH/g, and a glass transition temperature of 60 degrees Celsius.

Production of Resin Particle K

In accordance with the production example of resin particles described above, polymerization was performed using 6.0/3.0/1.5/0.25 (mass ratio) of styrene/n-butyl acrylate/acrylic acid/sodium dodecyl sulfate as monomers and an emulsifier. After the polymerization, purification and concentration yielded a resin particle K with a solid content of 10% by mass. The resin particle K had an average particle size of 82 nm, an acid value of 100 mgKOH/g, and a glass transition temperature of 49 degrees Celsius.

Production of Resin Particle L

In accordance with the production example of resin particles described above, polymerization was performed using 3.0/6.0/1.5/0.1 (mass ratio) of styrene/n-butyl acrylate/acrylic acid/sodium dodecyl sulfate as monomers and an emulsifier. After the polymerization, purification and concentration yielded a resin particle L with a solid content of 10% by mass. The resin particle L had an average particle size of 95 nm, an acid value of 100 mgKOH/g, and a glass transition temperature of 21 degrees Celsius.

Production of Resin Particle M

In accordance with the production example of resin particles described above, polymerization was performed using 3.0/6.0/1.5/0.25 (mass ratio) of styrene/n-butyl acrylate/acrylic acid/sodium dodecyl sulfate as monomers and an emulsifier. After the polymerization, purification and concentration yielded a resin particle M with a solid content of 10% by mass. The resin particle M had an average particle size of 122 nm, an acid value of 101 mgKOH/g, and a glass transition temperature of −3 degrees Celsius.

Production of Resin Particle N

In accordance with the production example of resin particles described above, polymerization was performed using 1.5/7.5/1.5/0.25 (mass ratio) of styrene/n-butyl acrylate/acrylic acid/sodium dodecyl sulfate as monomers and an emulsifier. After the polymerization, purification and concentration yielded a resin particle N with a solid content of 10% by mass. The resin particle N had an average particle size of 64 nm, an acid value of 111 mgKOH/g, and a glass transition temperature of −31 degrees Celsius.

Production of Resin Particle O

In accordance with the production example of resin particles described above, polymerization was performed using 3.0/6.0/1.5/0.1 (mass ratio) of styrene/n-butyl acrylate/acrylic acid/sodium dodecyl sulfate as monomers and an emulsifier. After the polymerization, purification and concentration yielded a resin particle O with a solid content of 10% by mass. The resin particle O had an average particle size of 148 nm, an acid value of 101 mgKOH/g, and a glass transition temperature of −3 degrees Celsius.

Production of Resin Particle P

In accordance with the production example of resin particles described above, polymerization was performed using 3/6/1.5/0.05 (mass ratio) of styrene/n-butyl acrylate/acrylic acid/sodium dodecyl sulfate as monomers and an emulsifier. After the polymerization, purification and concentration yielded a resin particle P with a solid content of 10% by mass. The resin particle P had an average particle size of 163 nm, an acid value of 100 mgKOH/g, and a glass transition temperature of −1 degrees Celsius.

Production of Resin Particle Q

In accordance with the production example of resin particles described above, polymerization was performed using 3/6/1.5/0.040 (mass ratio) of styrene/n-butyl acrylate/acrylic acid/sodium dodecyl sulfate as monomers and an emulsifier. After the polymerization, purification and concentration yielded a resin particle Q with a solid content of 10% by mass. The resin particle Q had an average particle size of 183 nm, an acid value of 108 mgKOH/g, and a glass transition temperature of 0 degrees Celsius.

Production of Resin Particle R

In accordance with the production example of resin particles described above, polymerization was performed using 3/6/1.5/0.025 (mass ratio) of styrene/n-butyl acrylate/acrylic acid/sodium dodecyl sulfate as monomers and an emulsifier. After the polymerization, purification and concentration yielded a resin particle R with a solid content of 10% by mass. The resin particle R had an average particle size of 219 nm, an acid value of 100 mgKOH/g, and a glass transition temperature of −5 degrees Celsius.

Production of Resin Particle S

In accordance with the production example of resin particles described above, polymerization was performed using 3.5/6/1/0.050 (mass ratio) of styrene/n-butyl acrylate/acrylic acid/sodium dodecyl sulfate as monomers and an emulsifier. After the polymerization, purification and concentration yielded a resin particle S with a solid content of 10% by mass. The resin particle S had an average particle size of 152 nm, an acid value of 72 mgKOH/g, and a glass transition temperature of −5 degrees Celsius.

Production of Resin Particle T

In accordance with the production example of resin particles described above, polymerization was performed using 4/6/0.5/0.050 (mass ratio) of styrene/n-butyl acrylate/acrylic acid/sodium dodecyl sulfate as monomers and an emulsifier. After the polymerization, purification and concentration yielded a resin particle T with a solid content of 10% by mass. The resin particle T had an average particle size of 154 nm, an acid value of 35 mgKOH/g, and a glass transition temperature of −5 degrees Celsius.

Preparation of Ink

Preparation examples of inks used in the examples and comparative examples of the present invention will be described below. In the preparation of ink, all the components (100 parts in total) of ink listed in Tables 2 and 4 (black ink) and Tables 3 and 5 (color ink) were basically mixed, stirred for one hour, and passed through a filter having a pore size of 2.5 micrometers. Water in the tables was ion-exchanged water. Resin particles were neutralized with a pH adjusting agent listed in the tables. The values for self-dispersing pigments and resin particles were based on the solid content. Acetylenol (trade name) EH (manufactured by Kawaken Fine Chemicals Co., Ltd.) is an ethylene oxide adduct of acetylene glycol. The surface tension of ink was measured with CBVP-Z (manufactured by Kyowa Interface Science Co., Ltd.).

TABLE 2

| | Particle size <nm> | Acid value <mgKOH/g> | Tg <° C.> | Example | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 |
| Self-dispersing pigment A | — | — | — | 4.0 | 4.0 | 4.0 | 4.0 | 4.0 | 4.0 | 4.0 | 4.0 | — | — | — |
| Self-dispersing pigment E | — | — | — | — | — | — | — | — | — | — | — | 4.0 | 4.0 | 4.0 |
| Resin particles A | 283 | 100 | 110 | — | — | — | — | — | — | — | — | — | — | — |
| Resin particles B | 97 | 90 | 121 | 0.2 | 0.5 | 1.5 | — | — | — | — | — | — | 0.4 | — |
| Resin particles C | 96 | 100 | 100 | — | — | — | 1.2 | — | — | 0.5 | 0.3 | 0.4 | — | — |
| Resin particles D | 77 | 100 | 122 | — | — | — | — | — | — | — | — | — | — | — |

TABLE 2-continued

| | | | | | | | | | | | | | |
|---|---|---|---|---|---|---|---|---|---|---|---|---|---|
| Resin particles E | 48 | 100 | 111 | — | — | — | — | — | — | — | — | — | — |
| Resin particles F | 41 | 100 | 112 | — | — | — | — | — | — | — | — | — | — |
| Resin particles G | 28 | 100 | 101 | — | — | — | — | — | — | — | — | — | — |
| Resin particles H | 81 | 182 | 116 | — | — | — | — | — | — | — | — | — | — |
| Resin particles I | 84 | 318 | 119 | — | — | — | — | — | — | — | — | — | — |
| Resin particles J | 44 | 100 | 60 | — | — | — | — | — | — | — | — | — | — |
| Resin particles K | 82 | 100 | 49 | — | — | — | — | 0.8 | 0.4 | — | — | — | 1.2 |
| Resin particles L | 95 | 100 | 21 | — | — | — | — | — | — | — | — | — | — |
| Resin particles M | 122 | 101 | −3 | — | — | — | — | — | — | — | — | — | — |
| Resin particles N | 64 | 111 | −31 | — | — | — | — | — | — | — | — | — | — |
| Resin particles O | 148 | 101 | −3 | 1.8 | 1.0 | 0.5 | — | — | — | — | — | — | — |
| Resin particles P | 163 | 100 | −1 | — | — | — | 0.8 | — | — | — | — | 0.8 | — |
| Resin particles Q | 183 | 108 | 0 | — | — | — | — | 1.2 | — | — | — | — | — |
| Resin particles R | 219 | 100 | −5 | — | — | — | — | — | 1.6 | — | — | — | — |
| Resin particles S | 152 | 72 | −5 | — | — | — | — | — | — | 1.5 | — | 1.6 | 0.8 | — |
| Resin particles T | 154 | 35 | −5 | — | — | — | — | — | — | — | 1.7 | — | — | 0.8 |
| Potassium phthalate | — | — | — | — | — | — | — | — | — | — | — | 0.5 | — | — |
| Ammonium phthalate | — | — | — | — | — | — | — | — | — | — | — | — | 0.5 | — |
| 1,2-hexanediol | — | — | — | 5.0 | 5.0 | 5.0 | 5.0 | 5.0 | — | 5.0 | — | 5.0 | 5.0 | — |
| Trimethylol-propane | — | — | — | 15.0 | 15.0 | 15.0 | 15.0 | 15.0 | 20.0 | 15.0 | 20.0 | 15.0 | 15.0 | 20.0 |
| Isopropanol | — | — | — | 0.5 | 0.5 | 0.5 | 0.5 | 0.5 | 0.5 | 0.5 | 0.5 | 0.5 | 0.5 | 0.5 |
| Acetylenol EH | — | — | — | 1.0 | 1.0 | 1.0 | 1.0 | 10 | 1.0 | 1.0 | 1.0 | 1.0 | 1.0 | 1.0 |
| Water | — | — | — | Remainder | Remainder | Remainder | Remainder | Remainder | Remainder | Remainder | Remainder | Remainder | Remainder | Remainder |
| pH adjusting agent | — | — | — | KOH | KOH | KOH | KOH | KOH | KOH | KOH | KOH | KOH | KOH | KOH |
| Surface tension <mN/m> | — | — | — | 31 | 31 | 31 | 31 | 31 | 32 | 31 | 32 | 30 | 32 | 30 |

| | Comparative example | | | | | | | | | | |
|---|---|---|---|---|---|---|---|---|---|---|---|
| | 1 | 2 | 3 | 4 | 5 | 6 | 7 | 8 | 9 | 10 | 11 |
| Self-dispersing pigment A | 4.0 | 4.0 | 4.0 | 4.0 | 4.0 | 4.0 | 4.0 | 4.0 | — | — | — |
| Self-dispersing pigment E | — | — | — | — | — | — | — | — | 4.0 | 4.0 | 4.0 |
| Resin particles A | — | — | — | — | — | 0.4 | — | — | — | — | — |
| Resin particles B | — | — | — | — | — | — | — | 0.8 | — | — | — |
| Resin particles C | — | 2.0 | — | — | — | — | — | — | — | — | — |
| Resin particles D | — | — | — | — | — | — | — | — | — | 0.8 | — |
| Resin particles E | — | — | 1.5 | — | — | — | — | — | — | — | — |
| Resin particles F | — | — | — | — | 1.0 | — | — | — | — | — | — |
| Resin particles G | — | — | — | — | — | 1.2 | — | — | — | — | — |
| Resin particles H | — | — | — | — | — | — | — | 0.8 | — | — | — |
| Resin particles I | — | — | — | — | — | — | — | — | 1.2 | — | — |
| Resin particles J | — | — | — | 0.4 | — | — | — | — | — | — | — |
| Resin particles K | — | — | — | — | — | — | — | — | — | — | — |
| Resin particles L | — | — | — | 0.8 | — | — | — | — | — | — | 2.0 |
| Resin particles M | — | — | — | — | — | — | — | — | — | 0.2 | — |
| Resin particles N | — | — | — | 0.8 | 1.0 | — | — | — | — | — | — |
| Resin particles O | — | — | — | — | — | — | — | — | — | — | — |
| Resin particles P | — | — | — | — | — | 0.4 | — | — | — | — | — |
| Resin particles Q | — | — | — | — | — | — | — | 1.2 | — | — | — |
| Resin particles R | — | — | — | — | — | — | — | — | — | — | — |
| Resin particles S | — | — | — | — | — | — | — | — | — | — | — |
| Resin particles T | — | — | — | — | — | — | — | — | — | — | — |
| Potassium phthalate | — | — | — | — | — | — | — | — | — | — | — |
| Ammonium phthalate | — | — | — | — | — | — | — | — | — | — | — |
| 1,2-hexanediol | 5.0 | 5.0 | 5.0 | 5.0 | 5.0 | 5.0 | — | 5.0 | 5.0 | 5.0 | 5.0 |
| Trimethylol-propane | 15.0 | 15.0 | 15.0 | 15.0 | 15.0 | 15.0 | 20.0 | 15 | 15.0 | 15.0 | 15.0 |
| Isopropanol | 0.5 | 0.5 | 0.5 | 0.5 | 0.5 | 0.5 | 0.5 | 0.5 | 0.5 | 0.5 | 0.5 |
| Acetylenol EH | 1.0 | 1.0 | 1.0 | 1.0 | 1.0 | 0.1 | 1.0 | 1.0 | 1.0 | 1.0 | 1.0 |
| Water | Remainder | Remainder | Remainder | Remainder | Remainder | Remainder | Remainder | Remainder | Remainder | Remainder | Remainder |
| pH adjusting agent | — | KOH | KOH | KOH | KOH | KOH | KOH | KOH | — | KOH | KOH |
| Surface tension <mN/m> | 30 | 31 | 31 | 31 | 31 | 39 | 32 | 31 | 31 | 31 | 31 |

TABLE 3

| | Particle size <nm> | Acid value <mgKOH/g> | Tg <° C.> | Example | | | | | | | | | | | |
|---|---|---|---|---|---|---|---|---|---|---|---|---|---|---|---|
| | | | | 12 | 13 | 14 | 15 | 16 | 17 | 18 | 19 | 20 | 21 | 22 | 23 |
| Self-dispersing pigment B | — | — | — | 4.0 | 4.0 | 4.0 | — | — | — | — | — | — | — | — | — |
| Self-dispersing pigment C | — | — | — | — | — | — | 4.0 | 4.0 | 4.0 | — | — | — | — | — | — |
| Self-dispersing pigment D | — | — | — | — | — | — | — | — | — | 4.0 | 4.0 | 4.0 | — | — | — |
| Self-dispersing pigment F | — | — | — | — | — | — | — | — | — | — | — | — | 4.0 | — | — |

TABLE 3-continued

| Component | | | | | | | | | | | | | | | |
|---|---|---|---|---|---|---|---|---|---|---|---|---|---|---|---|
| Self-dispersing pigment G | — | — | — | — | — | — | — | — | — | — | — | — | — | 4.0 | — |
| Self-dispersing pigment H | — | — | — | — | — | — | — | — | — | — | — | — | — | — | 4.0 |
| Resin particles A | 283 | 100 | 110 | — | — | — | — | — | — | — | — | — | — | 0.4 | — |
| Resin particles B | 97 | 90 | 121 | 0.2 | 0.5 | 1.5 | — | — | — | — | — | — | — | 0.4 | — |
| Resin particles C | 96 | 100 | 100 | — | — | — | 1.2 | — | — | 0.5 | 0.3 | 0.4 | — | — | — |
| Resin particles D | 77 | 100 | 122 | — | — | — | — | — | — | — | — | — | — | — | — |
| Resin particles E | 48 | 100 | 111 | — | — | — | — | — | — | — | — | — | — | — | — |
| Resin particles F | 41 | 100 | 112 | — | — | — | — | — | — | — | — | — | — | — | — |
| Resin particles G | 28 | 100 | 101 | — | — | — | — | — | — | — | — | — | — | — | — |
| Resin particles H | 81 | 182 | 116 | — | — | — | — | — | — | — | — | — | — | — | — |
| Resin particles I | 84 | 318 | 119 | — | — | — | — | — | — | — | — | — | — | — | — |
| Resin particles J | 44 | 100 | 60 | — | — | — | — | — | — | — | — | — | — | — | — |
| Resin particles K | 82 | 100 | 49 | — | — | — | 0.8 | 0.4 | — | — | — | — | 1.2 | 0.8 | — |
| Resin particles L | 95 | 100 | 21 | — | — | — | — | — | — | — | — | — | — | — | — |
| Resin particles M | 122 | 101 | −3 | — | — | — | — | — | — | — | — | — | — | — | — |
| Resin particles N | 64 | 111 | −31 | — | — | — | — | — | — | — | — | — | — | — | — |
| Resin particles O | 148 | 101 | −3 | 1.8 | 1.0 | 0.5 | — | — | — | — | — | — | — | — | — |
| Resin particles P | 163 | 100 | −1 | — | — | — | 0.8 | — | — | — | — | — | 0.8 | — | — |
| Resin particles Q | 183 | 108 | 0 | — | — | — | — | 1.2 | — | — | — | — | — | — | — |
| Resin particles R | 219 | 100 | −5 | — | — | — | — | — | 1.6 | — | — | — | — | — | — |
| Resin particles S | 152 | 72 | −5 | — | — | — | — | — | — | 1.5 | — | 1.6 | 0.8 | — | — |
| Resin particles T | 154 | 35 | −5 | — | — | — | — | — | — | — | 1.7 | — | — | 0.8 | 1.2 |
| Potassium phthalate | — | — | — | — | — | — | — | — | — | — | — | — | 0.5 | — | — |
| Ammonium phthalate | — | — | — | — | — | — | — | — | — | — | — | — | — | 0.5 | — |
| 1,2-hexanediol | — | — | — | 5.0 | 5.0 | 5.0 | 5.0 | 5.0 | — | 5.0 | — | 5.0 | 5.0 | — | 5.0 |
| Trimethylol-propane | — | — | — | 15.0 | 15.0 | 15.0 | 15.0 | 15.0 | 20.0 | 15.0 | 20.0 | 15.0 | 15.0 | 20.0 | 15.0 |
| Isopropanol | — | — | — | 0.5 | 0.5 | 0.5 | 0.5 | 0.5 | 0.5 | 0.5 | 0.5 | 0.5 | 0.5 | 0.5 | 0.5 |
| Acetylenol EH | — | — | — | 1.0 | 1.0 | 1.0 | 1.0 | 1.0 | 1.0 | 1.0 | 1.0 | 1.0 | 1.0 | 1.0 | 1.0 |
| Water | — | — | — | Remainder | Remainder | Remainder | Remainder | Remainder | Remainder | Remainder | Remainder | Remainder | Remainder | Remainder | Remainder |
| pH adjusting agent | — | — | — | KOH | KOH | KOH | KOH | KOH | KOH | KOH | KOH | KOH | KOH | KOH | KOH |
| Surface tension <mN/m> | — | — | — | 31 | 31 | 31 | 31 | 31 | 32 | 31 | 32 | 30 | 32 | 30 | 32 |

| | Comparative example | | | | | | | | | | |
|---|---|---|---|---|---|---|---|---|---|---|---|
| | 12 | 13 | 14 | 15 | 16 | 17 | 18 | 19 | 20 | 21 | 22 |
| Self-dispersing pigment B | 4.0 | 4.0 | 4.0 | — | — | — | — | — | — | — | — |
| Self-dispersing pigment C | — | — | — | 4.0 | 4.0 | — | — | — | — | — | — |
| Self-dispersing pigment D | — | — | — | — | — | 4.0 | 4.0 | — | — | — | — |
| Self-dispersing pigment F | — | — | — | — | — | — | — | 4.0 | — | — | — |
| Self-dispersing pigment G | — | — | — | — | — | — | — | — | 4.0 | — | — |
| Self-dispersing pigment H | — | — | — | — | — | — | — | — | — | 4.0 | 4.0 |
| Resin particles A | — | — | — | — | — | 0.4 | — | — | — | — | — |
| Resin particles B | — | — | — | — | — | — | — | 0.8 | — | — | — |
| Resin particles C | — | 2.0 | — | — | — | — | — | — | — | — | — |
| Resin particles D | — | — | — | — | — | — | — | — | — | 0.8 | — |
| Resin particles E | — | — | 1.5 | — | — | — | — | — | — | — | — |
| Resin particles F | — | — | — | — | — | 1.0 | — | — | — | — | — |
| Resin particles G | — | — | — | — | — | — | 1.2 | — | — | — | — |
| Resin particles H | — | — | — | — | — | — | 0.8 | — | — | — | — |
| Resin particles I | — | — | — | — | — | — | — | 1.2 | — | — | — |
| Resin particles J | 0.4 | — | — | — | — | — | — | — | — | — | — |
| Resin particles K | — | — | — | — | — | — | — | — | — | — | — |
| Resin particles L | 0.8 | — | — | — | — | — | — | — | — | — | 2.0 |
| Resin particles M | — | — | — | — | — | — | — | — | — | 0.2 | — |
| Resin particles N | 0.8 | — | — | — | 1.0 | — | — | — | — | — | — |
| Resin particles O | — | — | — | — | — | — | — | — | — | — | — |
| Resin particles P | — | — | — | — | — | 0.4 | — | — | — | — | — |
| Resin particles Q | — | — | — | — | — | — | — | — | 1.2 | — | — |
| Resin particles R | — | — | — | — | — | — | — | — | — | — | — |
| Resin particles S | — | — | — | — | — | — | — | — | — | — | — |
| Resin particles T | — | — | — | — | — | — | — | — | — | — | — |
| Potassium phthalate | — | — | — | — | — | — | — | — | — | — | — |
| Ammonium phthalate | — | — | — | — | — | — | — | — | — | — | — |
| 1,2-hexanediol | 5.0 | 5.0 | 5.0 | 5.0 | 5.0 | 5.0 | — | 5.0 | 5.0 | 5.0 | 5.0 |
| Trimethylol-propane | 15.0 | 15.0 | 15.0 | 15.0 | 15.0 | 15.0 | 20.0 | 15.0 | 15.0 | 15.0 | 15.0 |
| Isopropanol | 0.5 | 0.5 | 0.5 | 0.5 | 0.5 | 0.5 | 0.5 | 0.5 | 0.5 | 0.5 | 0.5 |
| Acetylenol EH | 1.0 | 1.0 | 1.0 | 1.0 | 1.0 | 0.1 | 1.0 | 1.0 | 1.0 | 1.0 | 1.0 |
| Water | Remainder | Remainder | Remainder | Remainder | Remainder | Remainder | Remainder | Remainder | Remainder | Remainder | Remainder |
| pH adjusting agent | — | KOH | KOH | KOH | KOH | KOH | KOH | KOH | — | KOH | KOH |
| Surface tension <mN/m> | 30 | 31 | 31 | 31 | 31 | 39 | 32 | 31 | 31 | 31 | 31 |

TABLE 4

| | Particle size <nm> | Acid value <mgKOH/g> | Tg <°C.> | Example 24 | 25 | 26 | 27 | 28 | 29 | 30 | 31 | 32 | 33 | 34 |
|---|---|---|---|---|---|---|---|---|---|---|---|---|---|---|
| Self-dispersing pigment A | — | — | — | 2.0 | 2.0 | 2.0 | 2.0 | 2.0 | 2.0 | 2.0 | 2.0 | — | — | — |
| Self-dispersing pigment E | — | — | — | — | — | — | — | — | — | — | — | 2.0 | 2.0 | 2.0 |
| Resin particle A | 283 | 100 | 110 | — | — | — | — | — | — | — | — | — | — | — |
| Resin particle B | 97 | 90 | 121 | 0.2 | 0.5 | 1.5 | — | — | — | — | — | — | 0.4 | — |
| Resin particle C | 96 | 100 | 100 | — | — | — | 1.2 | — | — | 0.5 | 0.3 | 0.4 | — | — |
| Resin particle D | 77 | 100 | 122 | — | — | — | — | — | — | — | — | — | — | — |
| Resin particle E | 48 | 100 | 111 | — | — | — | — | — | — | — | — | — | — | — |
| Resin particle F | 41 | 100 | 112 | — | — | — | — | — | — | — | — | — | — | — |
| Resin particle G | 28 | 100 | 101 | — | — | — | — | — | — | — | — | — | — | — |
| Resin particle H | 81 | 182 | 116 | — | — | — | — | — | — | — | — | — | — | — |
| Resin particle I | 84 | 318 | 119 | — | — | — | — | — | — | — | — | — | — | — |
| Resin particle J | 44 | 100 | 60 | — | — | — | — | — | — | — | — | — | — | — |
| Resin particle K | 82 | 100 | 49 | — | — | — | — | 0.8 | 0.4 | — | — | — | — | 1.2 |
| Resin particle L | 95 | 100 | 21 | — | — | — | — | — | — | — | — | — | — | — |
| Resin particle M | 122 | 101 | −3 | — | — | — | — | — | — | — | — | — | — | — |
| Resin particle N | 64 | 111 | −31 | — | — | — | — | — | — | — | — | — | — | — |
| Resin particle O | 148 | 101 | −3 | 1.8 | 1.0 | 0.5 | — | — | — | — | — | — | — | — |
| Resin particle P | 163 | 100 | −1 | — | — | — | 0.8 | — | — | — | — | — | 0.8 | — |
| Resin particle Q | 183 | 108 | 0 | — | — | — | — | — | 1.2 | — | — | — | — | — |
| Resin particle R | 219 | 100 | −5 | — | — | — | — | — | — | 1.6 | — | — | — | — |
| Resin particle S | 152 | 72 | −5 | — | — | — | — | — | — | — | 1.5 | — | 1.6 | 0.8 |
| Resin particle T | 154 | 35 | −5 | — | — | — | — | — | — | — | — | 1.7 | — | 0.8 |
| Potassium phthalate | — | — | — | — | — | — | — | — | — | — | — | 0.5 | — | — |
| Ammonium phthalate | — | — | — | — | — | — | — | — | — | — | — | — | 0.5 | — |
| 1,2-hexanediol | — | — | — | 5.0 | 5.0 | 5.0 | 5.0 | 5.0 | — | 5.0 | — | 5.0 | 5.0 | — |
| Trimethylolpropane | — | — | — | 15.0 | 15.0 | 15.0 | 15.0 | 15.0 | 20.0 | 15.0 | 20.0 | 15.0 | 15.0 | 20.0 |
| Isopropanol | — | — | — | 0.5 | 0.5 | 0.5 | 0.5 | 0.5 | 0.5 | 0.5 | 0.5 | 0.5 | 0.5 | 0.5 |
| Acetylenol EH | — | — | — | 1.0 | 1.0 | 1.0 | 1.0 | 1.0 | 1.0 | 1.0 | 1.0 | 1.0 | 1.0 | 1.0 |
| Water | — | — | — | Remainder | Remainder | Remainder | Remainder | Remainder | Remainder | Remainder | Remainder | Remainder | Remainder | Remainder |
| pH adjusting agent | — | — | — | KOH | KOH | KOH | KOH | KOH | KOH | KOH | KOH | KOH | KOH | KOH |
| Surface tension <mN/m> | — | — | — | 31 | 31 | 31 | 31 | 31 | 32 | 31 | 32 | 30 | 32 | 30 |

| | Comparative example 23 | 24 | 25 | 26 | 27 | 28 | 29 | 30 | 31 | 32 | 33 |
|---|---|---|---|---|---|---|---|---|---|---|---|
| Self-dispersing pigment A | 2.0 | 2.0 | 2.0 | 2.0 | 2.0 | 2.0 | 2.0 | 2.0 | — | — | — |
| Self-dispersing pigment E | — | — | — | — | — | — | — | — | 2.0 | 2.0 | 2.0 |
| Resin particle A | — | — | — | — | — | 0.4 | — | — | — | — | — |
| Resin particle B | — | — | — | — | — | — | — | 0.8 | — | — | — |
| Resin particle C | — | 2.0 | — | — | — | — | — | — | — | — | — |
| Resin particle D | — | — | — | — | — | — | — | — | — | 0.8 | — |
| Resin particle E | — | — | 1.5 | — | — | — | — | — | — | — | — |
| Resin particle F | — | — | — | — | 1.0 | — | — | — | — | — | — |
| Resin particle G | — | — | — | — | — | — | 1.2 | — | — | — | — |
| Resin particle H | — | — | — | — | — | — | — | 0.8 | — | — | — |
| Resin particle I | — | — | — | — | — | — | — | — | 1.2 | — | — |
| Resin particle J | — | — | — | 0.4 | — | — | — | — | — | — | — |
| Resin particle K | — | — | — | — | — | — | — | — | — | — | — |
| Resin particle L | — | — | — | 0.8 | — | — | — | — | — | — | 2.0 |
| Resin particle M | — | — | — | — | — | — | — | — | — | 0.2 | — |
| Resin particle N | — | — | — | 0.8 | 1.0 | — | — | — | — | — | — |
| Resin particle O | — | — | — | — | — | — | — | — | — | — | — |
| Resin particle P | — | — | — | — | — | — | 0.4 | — | — | — | — |
| Resin particle Q | — | — | — | — | — | — | — | 1.2 | — | — | — |
| Resin particle R | — | — | — | — | — | — | — | — | — | — | — |
| Resin particle S | — | — | — | — | — | — | — | — | — | — | — |
| Resin particle T | — | — | — | — | — | — | — | — | — | — | — |
| Potassium phthalate | — | — | — | — | — | — | — | — | — | — | — |
| Ammonium phthalate | — | — | — | — | — | — | — | — | — | — | — |
| 1,2-hexanediol | 5.0 | 5.0 | 5.0 | 5.0 | 5.0 | 5.0 | — | 5.0 | 5.0 | 5.0 | 5.0 |
| Trimethylolpropane | 15.0 | 15.0 | 15.0 | 15.0 | 15.0 | 15.0 | 20.0 | 15 | 15.0 | 15.0 | 15.0 |
| Isopropanol | 0.5 | 0.5 | 0.5 | 0.5 | 0.5 | 0.5 | 0.5 | 0.5 | 0.5 | 0.5 | 0.5 |
| Acetylenol EH | 1.0 | 1.0 | 1.0 | 1.0 | 1.0 | 1.0 | 1.0 | 1.0 | 1.0 | 1.0 | 1.0 |
| Water | Remainder | Remainder | Remainder | Remainder | Remainder | Remainder | Remainder | Remainder | Remainder | Remainder | Remainder |
| pH adjusting agent | — | KOH | KOH | KOH | KOH | KOH | KOH | KOH | — | KOH | KOH |
| Surface tension <mN/m> | 30 | 31 | 31 | 31 | 31 | 39 | 32 | 31 | 31 | 31 | 31 |

TABLE 5

|  | Particle size <nm> | Acid value <mgKOH/g> | Tg <° C.> | Example |  |  |  |  |  |  |  |  |  |  |  |
|---|---|---|---|---|---|---|---|---|---|---|---|---|---|---|---|
|  |  |  |  | 35 | 36 | 37 | 38 | 39 | 40 | 41 | 42 | 43 | 44 | 45 | 46 |
| Self-dispersing pigment B | — | — | — | 2.0 | 2.0 | 2.0 | — | — | — | — | — | — | — | — | — |
| Self-dispersing pigment C | — | — | — | — | — | — | 2.0 | 2.0 | 2.0 | — | — | — | — | — | — |
| Self-dispersing pigment D | — | — | — | — | — | — | — | — | — | 2.0 | 20 | 2.0 | — | — | — |
| Self-dispersing pigment F | — | — | — | — | — | — | — | — | — | — | — | — | 2.0 | — | — |
| Self-dispersing pigment G | — | — | — | — | — | — | — | — | — | — | — | — | — | 2.0 | — |
| Self-dispersing pigment H | — | — | — | — | — | — | — | — | — | — | — | — | — | — | 2.0 |
| Resin particle A | 283 | 100 | 110 | — | — | — | — | — | — | — | — | — | — | — | — |
| Resin particle B | 97 | 90 | 121 | 0.2 | 0.5 | 1.5 | — | — | — | — | — | — | 0.4 | — | — |
| Resin particle C | 96 | 100 | 100 | — | — | — | 1.2 | — | — | 0.5 | 03 | 0.4 | — | — | — |
| Resin particle D | 77 | 100 | 122 | — | — | — | — | — | — | — | — | — | — | — | — |
| Resin particle E | 48 | 100 | 111 | — | — | — | — | — | — | — | — | — | — | — | — |
| Resin particle F | 41 | 100 | 112 | — | — | — | — | — | — | — | — | — | — | — | — |
| Resin particle G | 28 | 100 | 101 | — | — | — | — | — | — | — | — | — | — | — | — |
| Resin particle H | 31 | 182 | 116 | — | — | — | — | — | — | — | — | — | — | — | — |
| Resin particle I | 84 | 318 | 119 | — | — | — | — | — | — | — | — | — | — | — | — |
| Resin particle J | 44 | 100 | 60 | — | — | — | — | — | — | — | — | — | — | — | — |
| Resin particle K | 82 | 100 | 49 | — | — | — | — | — | 0.8 | 0.4 | — | — | — | 1.2 | 0.8 |
| Resin particle L | 95 | 100 | 21 | — | — | — | — | — | — | — | — | — | — | — | — |
| Resin particle M | 122 | 101 | −3 | — | — | — | — | — | — | — | — | — | — | — | — |
| Resin particle N | 64 | 111 | −31 | — | — | — | — | — | — | — | — | — | — | — | — |
| Resin particle O | 148 | 101 | −3 | 1.8 | 1.0 | 0.5 | — | — | — | — | — | — | — | — | — |
| Resin particle P | 163 | 100 | −1 | — | — | — | 0.8 | — | — | — | — | — | 0.8 | — | — |
| Resin particle Q | 183 | 108 | 0 | — | — | — | — | 1.2 | — | — | — | — | — | — | — |
| Resin particle R | 219 | 100 | −5 | — | — | — | — | — | 1.6 | — | — | — | — | — | — |
| Resin particle S | 152 | 72 | −5 | — | — | — | — | — | — | — | 1.5 | — | 1.6 | 0.8 | — |
| Resin particle T | 154 | 35 | −5 | — | — | — | — | — | — | — | — | 1.7 | — | 0.8 | 1.2 |
| Potassium phthalate | — | — | — | — | — | — | — | — | — | — | — | — | 0.5 | — | — |
| Ammonium phthalate | — | — | — | — | — | — | — | — | — | — | — | — | — | 0.5 | — |
| 1,2-hexanediol | — | — | — | 5.0 | 5.0 | 6.0 | 6.0 | 5.0 | — | 5.0 | — | 5.0 | 5.0 | — | 5.0 |
| Trimethylolpropane | — | — | — | 15.0 | 15.0 | 15.0 | 15.0 | 15.0 | 20.0 | 15.0 | 20.0 | 15.0 | 15.0 | 20.0 | 15.0 |
| Isopropanol | — | — | — | 0.5 | 0.5 | 0.5 | 0.5 | 0.5 | 0.5 | 0.5 | 05 | 0.5 | 0.5 | 0.5 | 0.5 |
| Acetylenol EH | — | — | — | 1.0 | 1.0 | 1.0 | 1.0 | 1.0 | 1.0 | 1.0 | 1.0 | 1.0 | 1.0 | 1.0 | 1.0 |
| Water | — | — | — | Remainder | Remainder | Remainder | Remainder | Remainder | Remainder | Remainder | Remainder | Remainder | Remainder | Remainder | Remainder |
| pH adjusting agent | — | — | — | KOH | KOH | KOH | KOH | KOH | KOH | KOH | KOH | KOH | KOH | KOH | KOH |
| Surface tension <mN/m> | — | — | — | 31 | 31 | 31 | 31 | 31 | 32 | 31 | 32 | 30 | 32 | 30 | 32 |

|  | Comparative example |  |  |  |  |  |  |  |  |  |  |
|---|---|---|---|---|---|---|---|---|---|---|---|
|  | 34 | 35 | 36 | 37 | 38 | 39 | 40 | 41 | 42 | 43 | 44 |
| Self-dispersing pigment B | 2.0 | 2.0 | 2.0 | — | — | — | — | — | — | — | — |
| Self-dispersing pigment C | — | — | — | 2.0 | 2.0 | — | — | — | — | — | — |
| Self-dispersing pigment D | — | — | — | — | — | 2.0 | 2.0 | — | — | — | — |
| Self-dispersing pigment F | — | — | — | — | — | — | — | 2.0 | — | — | — |
| Self-dispersing pigment G | — | — | — | — | — | — | — | — | 2.0 | — | — |
| Self-dispersing pigment H | — | — | — | — | — | — | — | — | — | 2.0 | 2.0 |
| Resin particle A | — | — | — | — | — | 0.4 | — | — | — | — | — |
| Resin particle B | — | — | — | — | — | — | — | 0.8 | — | — | — |
| Resin particle C | — | 2.0 | — | — | — | — | — | — | — | — | — |
| Resin particle D | — | — | — | — | — | — | — | — | — | 0.8 | — |
| Resin particle E | — | — | 1.5 | — | — | — | — | — | — | — | — |
| Resin particle F | — | — | — | — | 1.0 | — | — | — | — | — | — |
| Resin particle G | — | — | — | — | — | — | 1.2 | — | — | — | — |
| Resin particle H | — | — | — | — | — | — | — | 0.8 | — | — | — |
| Resin particle I | — | — | — | — | — | — | — | — | 1.2 | — | — |
| Resin particle J | 0.4 | — | — | — | — | — | — | — | — | — | — |
| Resin particle K | — | — | — | — | — | — | — | — | — | — | — |
| Resin particle L | 0.8 | — | — | — | — | — | — | — | — | — | 2.0 |
| Resin particle M | — | — | — | — | — | — | — | — | — | 0.2 | — |
| Resin particle N | 0.8 | — | — | — | 1.0 | — | — | — | — | — | — |
| Resin particle O | — | — | — | — | — | — | — | — | — | — | — |
| Resin particle P | — | — | — | — | — | 0.4 | — | — | — | — | — |
| Resin particle Q | — | — | — | — | — | — | 1.2 | — | — | — | — |
| Resin particle R | — | — | — | — | — | — | — | — | — | — | — |
| Resin particle S | — | — | — | — | — | — | — | — | — | — | — |
| Resin particle T | — | — | — | — | — | — | — | — | — | — | — |
| Potassium phthalate | — | — | — | — | — | — | — | — | — | — | — |
| Ammonium phthalate | — | — | — | — | — | — | — | — | — | — | — |
| 1,2-hexanediol | 5.0 | 5.0 | 5.0 | 5.0 | 5.0 | 5.0 | — | 5.0 | 5.0 | 5.0 | 5.0 |
| Trimethylolpropane | 15.0 | 15.0 | 15.0 | 15.0 | 15.0 | 15.0 | 20.0 | 15.0 | 15.0 | 15.0 | 15.0 |
| Isopropanol | 0.5 | 0.5 | 0.5 | 0.5 | 0.5 | 0.6 | 0.5 | 0.5 | 0.5 | 0.5 | 0.5 |
| Acetylenol EH | 1.0 | 1.0 | 1.0 | 1.0 | 1.0 | 0.1 | 1.0 | 1.0 | 10 | 1.0 | 1.0 |
| Water | Re- | Re- | Re- | Re- | Re- | Re- | Re- | Re- | Re- | Re- | Re- |

TABLE 5-continued

|  | remainder | remainder | remainder | remainder | remainder | remainder | remainder | remainder | remainder | remainder | remainder |
|---|---|---|---|---|---|---|---|---|---|---|---|
| pH adjusting agent | — | KOH | KOH | KOH | KOH | KOH | KOH | KOH | — | KOH | KOH |
| Surface tension <mN/m> | 30 | 31 | 31 | 31 | 31 | 39 | 32 | 31 | 31 | 31 | 31 |

Examples 1 to 46 and Comparative Examples 1 to 44

Evaluation of Recording Images

Images were formed with the inks according to Examples 1 to 46 and Comparative Examples 1 to 44. More specifically, each of the inks listed in Tables 2 and 3 was supplied to a cyan ink head and a black ink head of a printer. A solid image of 100% duty was printed by ejecting each ink at 50% duty.

The printer used was BJ F900 (manufactured by CANON KABUSHIKI KAISHA, six ejection-port-array heads each having 512 nozzles, 4.0 pl (fixed amount) of ink, a maximum resolution of 1200 dpi (horizontal)×1200 dpi (vertical)). The recording media on which ink was ejected were as follows:

Office Planner (manufactured by Canon Marketing Japan Inc., plain paper),

GF-500 (manufactured by Canon Marketing Japan Inc., plain paper),

OK prince high-quality (manufactured by Oji Paper Co., Ltd., uncoated printing paper), OK topcoat (manufactured by Oji Paper Co., Ltd., coated printing paper), OK Kinfuji (manufactured by Oji Paper Co., Ltd., coated printing paper), and PR-101 (manufactured by Canon Marketing Japan Inc., glossy photo paper).

Ejection Stability

Recording images formed on plain paper GF-500 were visually inspected in accordance with the following criteria:

a: no unprinted portion (blurred image) was observed,
b: a few unprinted portions were observed,
c: many unprinted portions were observed, and
d. almost no printed portion was observed.

Fastness Properties (Highlighter Resistance)

One minute after printing, recording images formed on Office Planner, GF-500, and OK prince high-quality paper using the inks according to Examples 1 to 23 and Comparative Examples 1 to 22 were marked with a highlighter pen (trade name: OPTEX2, yellow) manufactured by ZEBRA Co., Ltd. at normal writing pressure. An ink line from a boundary between the recording image and an unprinted portion was visually inspected in accordance with the following criteria:

a: no ink line and no stain on the pen nib were observed,
b: no ink line was observed, but the pen nib was slightly stained with ink,
c: a distinct ink line was observed,
d: almost no image was printed and consequently evaluation could not be performed, and
evaluation was not available (because a yellow ink was marked with a yellow highlighter pen, ink lines were not identified).

Fastness Properties (Highlighter Resistance after Heating)

An image was printed as described above except that the recording medium was uncoated printing paper (manufactured by Oji Paper Co., Ltd.). The recording image was heated in an oven at 60 degrees Celsius for 15 minutes. After the heat treatment, the recording image was cooled to room temperature (25 degrees Celsius) and was marked twice with a highlighter pen (trade name: OPTEX2, yellow) manufactured by ZEBRA Co., Ltd. at normal writing pressure. An ink line from a boundary between the recording image and an unprinted portion was visually inspected in accordance with the following criteria:

a: no ink line and no stain on the pen nib were observed,
b: no ink line was observed, but the pen nib was slightly stained with ink,
c: a distinct ink line was observed,
d: almost no image was printed and consequently evaluation could not be performed, and
evaluation was not available (because a yellow ink was marked with a yellow highlighter pen, ink lines were not identified).

Fastness Properties (Scratch Resistance)

The evaluation of scratch resistance was performed on recording images formed on OK Topcoat, OK Kinfuji, and PR-101 using inks according to Examples 24 to 46 and Comparative Examples 23 to 44. The recording images were rubbed 20 times with Silbon paper under normal writing pressure one minute after printing for PR-101 and two days after printing for OK Topcoat and OK Kinfuji. The degrees of fading of the recording images were visually inspected in accordance with the following criteria:

a: no fading and no stain of the Silbon paper were observed,
b: no fading was observed, but the Silbon paper was slightly stained with ink,
c: slight fading was observed,
d: distinct fading was observed, and
e: almost no image was printed and consequently evaluation could not be performed.

Tables 6 to 9 show the evaluation results.

TABLE 6

|  | Ejection stability | Highlighter resistance | | | Highlighter resistance after heating | | |
|---|---|---|---|---|---|---|---|
|  |  | Office Planner | GF-500 | OK Prince | Office Planner | GF-500 | OK Prince |
| Example 1 | a | a | a | a | a | a | a |
| Example 2 | a | a | a | a | a | a | a |
| Example 3 | a | a | a | a | a | a | a |
| Example 4 | a | a | a | a | a | a | a |
| Example 5 | a | a | a | a | a | a | a |
| Example 6 | a | a | a | a | a | a | a |
| Example 7 | a | a | a | a | a | a | a |
| Example 8 | a | a | a | a | a | a | a |

TABLE 6-continued

|  | Ejection stability | Highlighter resistance | | | Highlighter resistance after heating | | |
| --- | --- | --- | --- | --- | --- | --- | --- |
|  |  | Office Planner | GF-500 | OK Prince | Office Planner | GF-500 | OK Prince |
| Example 9 | a | a | a | a | a | a | a |
| Example 10 | a | a | a | a | a | a | a |
| Example 11 | a | a | a | a | a | a | a |
| Comparative example 1 | a | b | b | c | b | b | c |
| Comparative example 2 | b | b | b | c | b | b | c |
| Comparative example 3 | d | d | d | d | d | d | d |
| Comparative example 4 | c | a | b | b |  |  |  |
| Comparative example 5 | d | d | d | d | d | d | d |
| Comparative example 6 | d | d | d | d | d | d | d |
| Comparative example 7 | d | d | d | d | d | d | d |
| Comparative example 8 | d | d | d | d | d | d | d |
| Comparative example 9 | b | c | c | c | c | c | c |
| Comparative example 10 | b | b | c | c | a | b | b |
| Comparative example 11 | a | a | a | b | a | a | a |

TABLE 7

|  | Ejection stability | Highlighter resistance | | | Highlighter resistance after heating | | |
| --- | --- | --- | --- | --- | --- | --- | --- |
|  |  | Office Planner | GF-500 | OK Prince | Office Planner | GF-500 | OK Prince |
| Example 12 | a | — | — | — | — | — | — |
| Example 13 | a | — | — | — | — | — | — |
| Example 14 | a | — | — | — | — | — | — |
| Example 15 | a | a | a | a | a | a | a |
| Example 16 | a | a | a | a | a | a | a |
| Example 17 | a | a | a | a | a | a | a |
| Example 18 | a | a | a | a | a | a | a |
| Example 19 | a | a | a | a | a | a | a |
| Example 20 | a | a | a | a | 8 | a | a |
| Example 21 | a | — | — | — | — | — | — |
| Example 22 | a | a | a | a | 3 | a | a |
| Example 23 | a | a | a | a | a | a | a |
| Comparative example 12 | b | — | — | — | — | — | — |
| Comparative example 13 | b | — | — | — | — | — | — |
| Comparative example 14 | d | — | — | — | — | — | — |
| Comparative example 15 | a | b | b | b | a | b | b |
| Comparative example 16 | d | d | d | d | d | d | d |
| Comparative example 17 | d | d | d | d | d | d | d |
| Comparative example 18 | d | d | d | d | d | d | d |
| Comparative example 19 | d | — | — | — | — | — | — |
| Comparative example 20 | b | c | c | c | b | b | b |
| Comparative example 21 | b | c | c | c | b | b | b |
| Comparative example 22 | a | a | a | b | a | a | a |

Tables 6 and 7 show that the ink jet printing inks according to the examples of the present invention had high ejection stability, highlighter resistance, and highlighter resistance after heating.

TABLE 8

|  | Ejection stability | Scratch resistance | | |
| --- | --- | --- | --- | --- |
|  |  | PR-101 | OK Topcoat | OK Kinfuji |
| Example 24 | a | a | a | a |
| Example 25 | a | a | a | a |
| Example 26 | a | a | a | a |
| Example 27 | a | a | a | a |
| Example 28 | a | a | a | a |
| Example 29 | a | a | a | a |
| Example 30 | a | a | a | a |
| Example 31 | a | a | a | a |
| Example 32 | a | a | a | a |
| Example 33 | a | a | a | a |
| Example 34 | a | a | a | a |
| Comparative example 23 | a | d | d | d |
| Comparative example 24 | b | d | d | d |
| Comparative example 25 | d | e | e | e |
| Comparative example 26 | c | b | b | b |
| Comparative example 27 | d | e | e | e |
| Comparative example 28 | d | e | e | e |
| Comparative example 29 | d | e | e | e |
| Comparative example 30 | d | e | e | e |
| Comparative example 31 | b | d | d | d |
| Comparative example 32 | b | b | c | c |
| Comparative example 33 | a | a | a | b |

TABLE 9

|  | Ejection stability | Scratch resistance | | |
| --- | --- | --- | --- | --- |
|  |  | PR-101 | OK Topcoat | OK Kinfuji |
| Example 35 | a | a | a | a |
| Example 36 | a | a | a | a |
| Example 37 | a | a | a | a |
| Example 38 | a | a | a | a |
| Example 39 | a | a | a | a |
| Example 40 | a | a | a | a |
| Example 41 | a | a | a | a |
| Example 42 | a | a | a | a |
| Example 43 | a | a | a | a |
| Example 44 | a | a | a | a |
| Example 45 | a | a | a | a |
| Example 46 | a | a | a | a |
| Comparative example 34 | b | c | c | c |
| Comparative example 35 | b | d | d | d |
| Comparative example 36 | d | e | e | e |
| Comparative example 37 | a | d | d | d |
| Comparative example 38 | d | e | e | e |
| Comparative example 39 | d | e | e | e |
| Comparative example 40 | d | e | e | e |
| Comparative example 41 | d | e | e | e |
| Comparative example 42 | b | b | b | b |
| Comparative example 43 | b | b | b | b |
| Comparative example 44 | a | a | a | a |

Tables 8 and 9 show that the ink jet printing inks according to the examples of the present invention had high ejection stability and scratch resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-274960, filed Dec. 2, 2009 and No. 2010-234228 filed Oct. 19, 2010, which are hereby incorporated by reference herein in their entirety.

The invention claimed is:

1. An ink jet printing ink for use in an ink jet printing method in which the ink is ejected from a print head by the action of thermal energy, the ink jet printing ink comprising:
water, a self-dispersing pigment, a resin particle A, and a resin particle B wherein the resin particle A has an average particle size of 80 nm to 220 nm, an acid value of 25 mgKOH/g to 150 mgKOH/g, and a glass transition temperature of 25 degrees Celsius or less,
wherein the resin particle B has an average particle size of 80 nm to 220nm, an acid value of 25 mgKOH/g to 150 mgKOH/g, and a glass transition temperature of 25 degrees Celsius or more, and
wherein a difference in glass transition temperature between the resin particle A and the resin particle B is 10 degrees Celsius or more.

2. The ink jet printing ink according to claim 1, further comprising an inorganic acid salt and/or an organic acid salt.

3. The ink jet printing ink according to claim 1, wherein the ink jet printing ink has a surface tension of 34 mN/m or less.

4. A thermal ink jet printing method for ejecting an ink jet printing ink according to claim 1 from a print head by the action of thermal energy.

5. A thermal ink jet printer including a print head, wherein the thermal ink jet printer ejects an ink jet printing ink according to claim 1 from the print head to a recording medium by the action of thermal energy to form an image.

6. The ink for ink jet recording according to claim 1, wherein the ratio of the resin particle A content to the resin particle B content in the ink is 0.1 or more and 10.0 or less.

7. The ink for ink jet recording according to claim 2, wherein the inorganic acid salt and/or the organic acid salt is a salt of at least one compound selected from the group consisting of hydrochloric acid, sulfuric acid, nitric acid, citric acid, succinic acid, benzoic acid, acetic acid, propionic acid, phthalic acid, oxalic acid, tartaric acid, gluconic acid, tartronic acid, maleic acid, malonic acid, and adipic acid.

8. The ink for ink jet recording according to claim 2, wherein the inorganic acid salt and/or the organic acid salt is a salt of at least one compound selected from the group consisting of sulfuric acid, citric acid, succinic acid, phthalic acid, oxalic acid, tartaric acid, tartronic acid, maleic acid, malonic acid, and adipic acid.

9. The ink for ink jet recording according to claim 2, wherein a total proportion of the inorganic acid salt and/or the organic acid salt in the ink is in the range of 0.1% by mass to 5.0% by mass.

10. The ink for ink jet recording according to claim 1, further comprising trimethylolpropane.

11. The ink for ink jet recording according to claim 10, further comprising 1,2-hexanediol and 1,6-hexanediol.

12. The ink for ink jet recording according to claim 1, further comprising trimethylolpropane, 1,2-hexanediol and 1,6-hexanediol.

13. The ink for ink jet recording according to claim 1,
wherein the resin particle A has the acid value of 25 mgKOH/g to 140 mgKOH/g, and
wherein the resin particle B has the acid value of 25 mgKOH/g to 140 mgKOH/g.

* * * * *